US010565657B2

(12) United States Patent
Vickery et al.

(10) Patent No.: US 10,565,657 B2
(45) Date of Patent: Feb. 18, 2020

(54) METHODS AND APPARATUSES FOR RISK ASSESSMENT AND INSURING INTERMITTENT ELECTRICAL SYSTEMS

(71) Applicant: ENGIE Storage Services NA LLC, Santa Clara, CA (US)

(72) Inventors: Daniel C. Vickery, San Francisco, CA (US); Victor Shao, Mountain View, CA (US); Joshua Kaipo Lucas, Redwood City, CA (US); Ho Shing Abraham Poon, Mountain View, CA (US)

(73) Assignee: ENGIE STORAGE SERVICES NA LLC, Santa Clara, CA (US)

( * ) Notice: Subject to any disclaimer, the term of this patent is extended or adjusted under 35 U.S.C. 154(b) by 274 days.

(21) Appl. No.: 15/074,638

(22) Filed: Mar. 18, 2016

(65) Prior Publication Data

US 2017/0098279 A1   Apr. 6, 2017

Related U.S. Application Data

(63) Continuation of application No. 14/874,274, filed on Oct. 2, 2015, now abandoned.

(51) Int. Cl.
*G06Q 40/08* (2012.01)
*G06Q 50/06* (2012.01)
*G06Q 10/06* (2012.01)

(52) U.S. Cl.
CPC ......... *G06Q 40/08* (2013.01); *G06Q 10/0635* (2013.01); *G06Q 50/06* (2013.01)

(58) Field of Classification Search
CPC ........ G06Q 10/00; G06Q 20/00; G06Q 30/00; G06Q 40/00

(Continued)

(56) References Cited

U.S. PATENT DOCUMENTS 6,157,874 A    12/2000 Cooley et al.
7,783,544 B2 *  8/2010 Horowitz ............... G06Q 40/06
                                                    705/35

(Continued)

FOREIGN PATENT DOCUMENTS

WO        0111525 A1    2/2001
WO    2017035258 A1    3/2017

(Continued)

OTHER PUBLICATIONS

Jeon et al., "Using deferrable demand in a smart grid to reduce the cost of electricity for customers", Journal of Regulatory Economics, Springer Science+Business Media New York. (Year: 2015).*

(Continued)

*Primary Examiner* — Frantzy Poinvil
(74) *Attorney, Agent, or Firm* — Dorsey & Whitney LLP

(57) ABSTRACT

Methods and systems for generating a probability assessment for peak demand reduction for utility customers using a conditional-output energy generator are described. One method includes providing a customer data set and one or more historical generator production data sets for one or more intermittent generators that meteorologically correspond with the customer data set. Time intervals are defined in the data sets and a production distribution curve is generated for each time interval. A simulation is performed using the historical customer consumption data and the production distribution curves to obtain a net demand distribution curve for each time interval. These methods and systems may provide probability-based economic evaluation of consumption management systems.

15 Claims, 8 Drawing Sheets

(58) Field of Classification Search
USPC .................................................. 705/3–44
See application file for complete search history.

(56) References Cited

U.S. PATENT DOCUMENTS

| | | | | |
|---|---|---|---|---|
| 7,818,226 | B2* | 10/2010 | Brawley | G06Q 40/08 |
| | | | | 705/35 |
| 7,844,529 | B2* | 11/2010 | Ziade | G06Q 40/00 |
| | | | | 283/57 |
| 8,090,600 | B2* | 1/2012 | Ziade | G06Q 40/08 |
| | | | | 705/2 |
| 8,126,794 | B2* | 2/2012 | Lange | G06Q 30/08 |
| | | | | 705/36 R |
| 8,396,726 | B2* | 3/2013 | Ziade | G06Q 40/08 |
| | | | | 705/4 |
| 8,930,269 | B2* | 1/2015 | He | B60K 28/06 |
| | | | | 705/39 |
| 9,007,027 | B2 | 4/2015 | Prosser | |
| 9,048,671 | B2 | 6/2015 | Prosser | |
| 9,235,825 | B2 | 1/2016 | Shao | |
| 2004/0215529 | A1 | 10/2004 | Foster et al. | |
| 2007/0156559 | A1* | 7/2007 | Wolzenski | G06Q 40/00 |
| | | | | 705/35 |
| 2009/0006279 | A1 | 1/2009 | Buettner et al. | |
| 2010/0217550 | A1* | 8/2010 | Crabtree | H02J 3/005 |
| | | | | 702/62 |
| 2010/0217642 | A1* | 8/2010 | Crubtree | G06Q 10/00 |
| | | | | 705/7.12 |
| 2010/0332373 | A1* | 12/2010 | Crabtree | G06Q 40/04 |
| | | | | 705/37 |
| 2011/0022419 | A1* | 1/2011 | Ziade | G06Q 40/00 |
| | | | | 705/4 |
| 2011/0040666 | A1* | 2/2011 | Crabtree | G06Q 30/0283 |
| | | | | 705/37 |
| 2012/0101639 | A1 | 4/2012 | Carralero et al. | |
| 2012/0242148 | A1 | 9/2012 | Galati | |
| 2012/0245744 | A1 | 9/2012 | Prosser et al. | |
| 2013/0018821 | A1 | 1/2013 | Shao | |
| 2013/0024342 | A1* | 1/2013 | Horowitz | G06Q 40/00 |
| | | | | 705/35 |
| 2013/0030595 | A1 | 1/2013 | Chow | |
| 2013/0226544 | A1 | 8/2013 | Mcconaghy et al. | |
| 2013/0232151 | A1 | 9/2013 | Shao | |
| 2013/0285610 | A1 | 10/2013 | Katou et al. | |
| 2014/0019171 | A1* | 1/2014 | Koziol | G06Q 40/08 |
| | | | | 705/4 |
| 2015/0025917 | A1* | 1/2015 | Stempora | G06Q 40/08 |
| | | | | 705/4 |
| 2015/0094965 | A1* | 4/2015 | Schneider | G01R 21/133 |
| | | | | 702/58 |
| 2015/0295449 | A1 | 10/2015 | Prosser | |
| 2016/0006245 | A1 | 1/2016 | Chow | |
| 2016/0055412 | A1* | 2/2016 | Carroll | G06F 19/345 |
| | | | | 706/46 |
| 2016/0161932 | A1 | 6/2016 | Shao | |
| 2016/0360336 | A1 | 12/2016 | Gross et al. | |
| 2017/0060162 | A1 | 3/2017 | Holzman et al. | |
| 2017/0063083 | A1 | 3/2017 | Holzman | |
| 2017/0098229 | A1 | 4/2017 | Vickery et al. | |
| 2017/0098279 | A1 | 4/2017 | Vickery et al. | |
| 2017/0099056 | A1 | 4/2017 | Vickery et al. | |
| 2017/0243139 | A1 | 8/2017 | Dzierwa et al. | |
| 2017/0324256 | A1 | 11/2017 | Mcmorrow et al. | |
| 2018/0342867 | A1 | 11/2018 | Poon | |
| 2018/0358835 | A1 | 12/2018 | Tian et al. | |
| 2019/0020196 | A1 | 1/2019 | Poon | |

FOREIGN PATENT DOCUMENTS

| | | |
|---|---|---|
| WO | 2017040586 A1 | 3/2017 |
| WO | 2017059340 A1 | 4/2017 |
| WO | 2017059345 A1 | 4/2017 |
| WO | 2017059350 A1 | 4/2017 |

OTHER PUBLICATIONS

Johnson et al.", Renewable Generation Capacity and Wholesale Electricity Price Variance", Energy Journal, International Association for Energy Economics, Inc. (Year: 2019).*

PCT International Search Report for corresponding PCT International Patent Application No. PCT/US2016/054965, dated Nov. 16, 2016.

PCT International Search Report for corresponding PCT International Patent Application No. PCT/US2016/054973, dated Nov. 16, 2016.

PCT International Search Report for corresponding PCT International Patent Application No. PCT/US2016/054983, dated Nov. 16, 2016.

"A distribution-free approach to inducing rank correlation among input variables," by Ronald L. Iman and W. J. Conover, from Communications in Statistics—Simulation and Computation, vol. 11, Iss. 3, 1982, pp. 311-334.

* cited by examiner

Net Site Demand After Generator (kW) for 08:15-08:30 on Jan. 1

Net Demand After Peak Demand Reduction System for 08:15-08:30 on Jan. 1

Non-Generator Net Demand After Peak Demand Reduction System
(kW) for 08:15-08:30 on Jan. 1

METHODS AND APPARATUSES FOR RISK ASSESSMENT AND INSURING INTERMITTENT ELECTRICAL SYSTEMS

CROSS REFERENCE TO RELATED APPLICATIONS

This application is a continuation application of U.S. patent application Ser. No. 14/874,274, filed 2 Oct. 2015 and entitled DEMAND REDUCTION RISK MODELING AND PRICING SYSTEMS AND METHODS FOR INTERMITTENT ENERGY GENERATORS, pending, the entire disclosure of which is incorporated by this reference.

TECHNICAL FIELD

The present disclosure relates to systems and methods used to predict energy production of intermittent electrical energy generators and specifically relates to systems and methods used to assess risk of demand reduction provided by intermittent generators and peak demand reduction systems that operate with intermittent generators.

BACKGROUND

Electrical energy generators, including, for example, solar or photovoltaic (PV) generator panels and wind turbines, are becoming increasingly desirable for electricity consumers around the world. Using these generators, consumers can passively extract value from ambient weather and climate conditions to reduce their reliance on power generated by other sources. Consumers also find these generators attractive to reduce their utility bills. Although not all areas are well-suited for solar or wind power generation due to geography, weather, and climate conditions, consumers in the areas in which these energy sources are abundant can realize substantial savings in electricity and reduced dependence on the grid.

Some factors limiting the adoption of solar and other renewable energy sources include the cost of purchasing and installing the generators and the uncertainty in determining how much utility savings will be realized. Meteorological conditions such as storms, cloudy skies, and high or low winds can have a substantial impact on the amount of energy produced by the generators. Thus, these generators may be referred to as being intermittent or conditional-output generators due to their intermittent and inconsistent production, and there is uncertainty about how much a given generator will produce over time.

Solar panel providers have developed effective models for estimating average annual production of a solar panel positioned in various geographic locations, and they can estimate the value generated by a solar panel on an annual basis with relative certainty since long-term weather trends are, on average, consistent. Daily or hourly weather conditions are, however, much more unpredictable, especially far in advance. For example, while a meteorologist may be able to predict with a high degree of certainty that it will be cloudy during the short duration of 12:00 p.m. to 12:15 p.m. tomorrow or the general high and low temperature in a month from now, there is a high degree of uncertainty as to whether it will specifically be cloudy between 12:00 p.m. to 12:15 p.m. in two, six, or nine months from now.

Energy consumption management industries and consumption management system (CMS) providers are challenged by this uncertainty. A CMS, for example, may be used to reduce "peak demand charges" that are charged to customers based on the customer's peak average demand (e.g., in kW) over a short division of a billing period, such as over a 15-minute span of time in a 30-day billing cycle. The average demand over these short time periods is the net average consumption that is metered by the utility provider, so power contributed from any grid-independent energy sources (e.g., the customer's generators or energy storage systems) can reduce the average. A CMS may monitor the overall consumption of the site and discharge energy from an energy storage device to prevent the net metered consumption from exceeding a predetermined setpoint, thereby limiting peak demand charges by preventing the average consumption from increasing beyond the setpoint. In many cases, the CMS may use load prediction algorithms to anticipate the customer's average demand.

The unpredictability of intermittent generators makes predicting the customer's net consumption difficult as well. Precise predictions are important to energy consumption management industries since peak demand charges can be based on just one short peak demand charge measuring interval, and inaccuracies and imprecision during that one measuring interval that cause an unwanted peak in consumption can wipe out any benefits gained by used the CMS throughout the rest of a billing period. For example, the CMS may anticipate a normal load and a normal contribution of energy from a solar panel and from a battery source to offset that load and to keep the net load below a setpoint. If, however, even an unexpected 10-minute change of weather causes the solar panel to lose half of its production, the net load may spike, potentially in a manner that cannot be compensated for additional energy contribution by the CMS.

Because of these problems with predicting detailed performance of intermittent generators, energy consumption management industries are unable to guarantee peak demand charge savings that would be produced by the intermittent generators. Accordingly, there is a need for improvements in the prediction and simulation of load profiles generated by intermittent generators and for improvements in the ways that intermittent generators are assessed for implementation by utility customers.

SUMMARY

One aspect of the present disclosure relates to a method of generating a probability assessment for peak demand reduction for a utility customer using a conditional-output energy generator. The method may comprise providing a customer data set which includes customer meteorological data, data about a customer intermittent generator, and historical customer consumption data. The method may also include providing a plurality of historical generator production data sets for a plurality of intermittent generators. The plurality of historical generator production data sets may meteorologically correspond with the customer data set. The method may further include defining a plurality of time intervals and generating a production distribution curve for each time interval of the plurality of time intervals. Each production distribution curve may include production values of each of the intermittent generators at each time interval. The method may then include performing a simulation using the historical customer consumption data and the production distribution curves to obtain a net demand distribution curve for each time interval of the plurality of time intervals.

In some cases, a demand reduction probability distribution curve for the customer site may then be generated by simulating operation of a peak demand reduction system operating at the site over each net demand value in the net demand distribution curve. The simulation may be a Monte Carlo simulation.

In some embodiments, the historical customer consumption data comprises a consumption distribution curve for each time interval of the plurality of time intervals. Each consumption distribution curve may indicate historical customer consumption data corresponding with each time interval. The method may also include assigning a probability-weighted economic value to the customer intermittent generator using the demand reduction probability distribution curve. Another embodiment may comprise assigning a probability-weighted economic value to the peak demand reduction system using the demand reduction probability distribution curve. A probability of peak demand reduction by the customer intermittent generator may also be guaranteed.

In some arrangements the method may include determining a threshold demand reduction value using the demand reduction probability distribution curve and implementing a peak demand reduction system designed to provide the threshold demand reduction value. The peak demand reduction system may include the customer intermittent generator.

In another aspect of the disclosure, a computing device is provided that is configured for generating a probability assessment for peak demand reduction for a utility customer using a conditional-output energy generator. The computing device may comprise a processor and memory in electronic communication with the processor, wherein the memory stores computer executable instructions that, when executed by the processor, cause the processor to perform steps. The steps may include providing a customer data set that includes customer meteorological data, data about a customer intermittent generator, and historical customer consumption data; providing a plurality of historical generator production data sets for a plurality of intermittent generators, with the plurality of historical generator production data sets meteorologically corresponding with the customer data set; defining a plurality of time intervals; generating a production distribution curve for each time interval of the plurality of time intervals, with each production distribution curve including production values of each of the intermittent generators at each time interval; and performing a simulation using the historical customer consumption data and the production distribution curves to obtain a net demand distribution curve for each time interval of the plurality of time intervals.

The instructions may further cause the processor to generate a demand reduction probability distribution curve for the customer site by simulating operation of a peak demand reduction system operating at the site over each net demand value in the net demand distribution curve. In some embodiments, the historical customer consumption data comprises a consumption distribution curve for each time interval of the plurality of time intervals, with each consumption distribution curve indicating historical customer consumption data corresponding with each time interval. The instructions may further cause the processor to perform the step of assigning a probability-weighted economic value to the customer intermittent generator using the demand reduction probability distribution curve. The instructions may also further cause the processor to perform the step of assigning a probability-weighted economic value to the peak demand reduction system using the demand reduction probability distribution curve. The instructions may also further cause the processor to perform the step of guaranteeing a probability of peak demand reduction by the customer intermittent generator. In some embodiments, the instructions further cause the processor to perform the steps of determining a threshold demand reduction value using the demand reduction probability distribution curve and implementing a peak demand reduction system designed to provide the threshold demand reduction value. The peak demand reduction system may include the customer intermittent generator.

Another aspect of the disclosure relates to a non-transitory computer-readable storage medium storing computer executable instructions that, when executed by a processor, cause the processor to perform the steps of: providing a customer data set, with the customer data set including customer meteorological data, data about a customer intermittent generator, and historical customer consumption data; providing a plurality of historical generator production data sets for a plurality of intermittent generators, with the plurality of historical generator production data sets meteorologically corresponding with the customer data set; defining a plurality of time intervals; generating a production distribution curve for each time interval of the plurality of time intervals, with each production distribution curve including production values of each of the intermittent generators at each time interval; and performing a simulation using the historical customer consumption data and the production distribution curves to obtain a net demand distribution curve for each time interval of the plurality of time intervals.

The instructions may also cause the processor to perform a step of generating a demand reduction probability distribution curve for the customer site by simulating operation of a peak demand reduction system operating at the site over each net demand value in the net demand distribution curve. In some embodiments, the historical customer consumption data comprises a consumption distribution curve for each time interval of the plurality of time intervals, with each consumption distribution curve indicating historical customer consumption data corresponding with each time interval. The instructions may further cause the processor to perform the step of assigning a probability-weighted economic value to the customer intermittent generator using the demand reduction probability distribution curve. The instructions may also further cause the processor to perform the step of assigning a probability-weighted economic value to the peak demand reduction system using the demand reduction probability distribution curve. The steps may further comprise guaranteeing a probability of peak demand reduction by the customer intermittent generator. In some cases, the steps include determining a threshold demand reduction value using the demand reduction probability distribution curve and implementing a peak demand reduction system designed to provide the threshold demand reduction value. The peak demand reduction system may include the customer intermittent generator.

Another aspect of the disclosure relates to a method of insuring an intermittent generator of a customer at a customer site. The method may comprise determining a production distribution curve of the intermittent generator, referencing the production distribution curve to determine a risk of the intermittent generator failing to provide a threshold amount of power to the site, and insuring the customer against the intermittent generator failing to provide the threshold amount of power to the site.

The method may further comprise determining a financial value of the risk, assessing an insurance premium to the customer that is dependent upon the financial value of the risk, and/or determining an expected value of the production of the generator by assigning financial value to the production distribution curve, wherein the insurance premium may be less than an expected value of the production of the generator. Insuring the customer may comprise paying at least a portion of a peak demand charge for the customer when the intermittent generator fails to provide the threshold amount of power to the site. In some embodiments, the this portion of the peak demand charge may comprise a portion resulting from the intermittent generator failing to provide the threshold amount of power to the site.

The method may also be implemented using a computing device configured for generating the probability assessment for peak demand reduction. The device may comprise a processor and memory in electronic communication with the processor, wherein the memory stores computer executable instructions that, when executed by the processor, cause the processor to perform the steps of the method.

In some arrangements the method may be implemented as part of a non-transitory computer-readable storage medium storing computer executable instructions that, when executed by a processor, cause the processor to perform the steps of the method.

Another aspect of the disclosure may relate to a method of generating a probability assessment for peak demand reduction for a utility customer using a consumption management system. The method may comprise receiving demand data and mitigation data for a billing period, generating a distribution curve of the demand using the demand data, and generating a distribution curve of the mitigation using the mitigation data. The net demand of the customer may then be simulated by randomly sampling the distribution curve of the demand and the distribution curve of the mitigation to generate a net demand distribution curve for a plurality of time intervals. The method may also include simulating expected revenue generated by the consumption management system by randomly sampling the net demand distribution curves of each time interval of the plurality of time intervals to generate an expected revenue distribution curve for the billing period.

Each of the plurality of time intervals of the demand data and mitigation data may span about 15-minute intervals and the billing period may be about one month. The random sampling may comprise using a Monte Carlo simulation. Iterating the simulation of net demand may be performed using at least one of: a plurality of consumption management system setpoints, a plurality of peak demand reduction system configurations, and a plurality of intermittent generator configurations, wherein a plurality of net demand distribution curves are generated for the plurality of time intervals. The method may further comprise identifying an optimal system configuration from the plurality of net demand distribution curves based on a risk tolerance of a financier, insurer, or purchaser of the consumption management system, and implementing the optimal system configuration at the customer site.

In some embodiments the method may further comprise generating a plurality of expected revenue distribution curves for a plurality of billing periods including the billing period and simulating multi-period revenue from the consumption management system by randomly sampling the plurality of expected revenue distribution curves of the plurality of billing periods. Simulating multi-period revenue may comprise using a Monte Carlo simulation.

The method may also be implemented using a computing device configured for generating the probability assessment for peak demand reduction. The device may comprise a processor and memory in electronic communication with the processor, wherein the memory stores computer executable instructions that, when executed by the processor, cause the processor to perform the steps of the method.

In some arrangements the method may be implemented as part of a non-transitory computer-readable storage medium storing computer executable instructions that, when executed by a processor, cause the processor to perform the steps of the method.

The above summary of the present invention is not intended to describe each embodiment or every implementation of the present invention. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
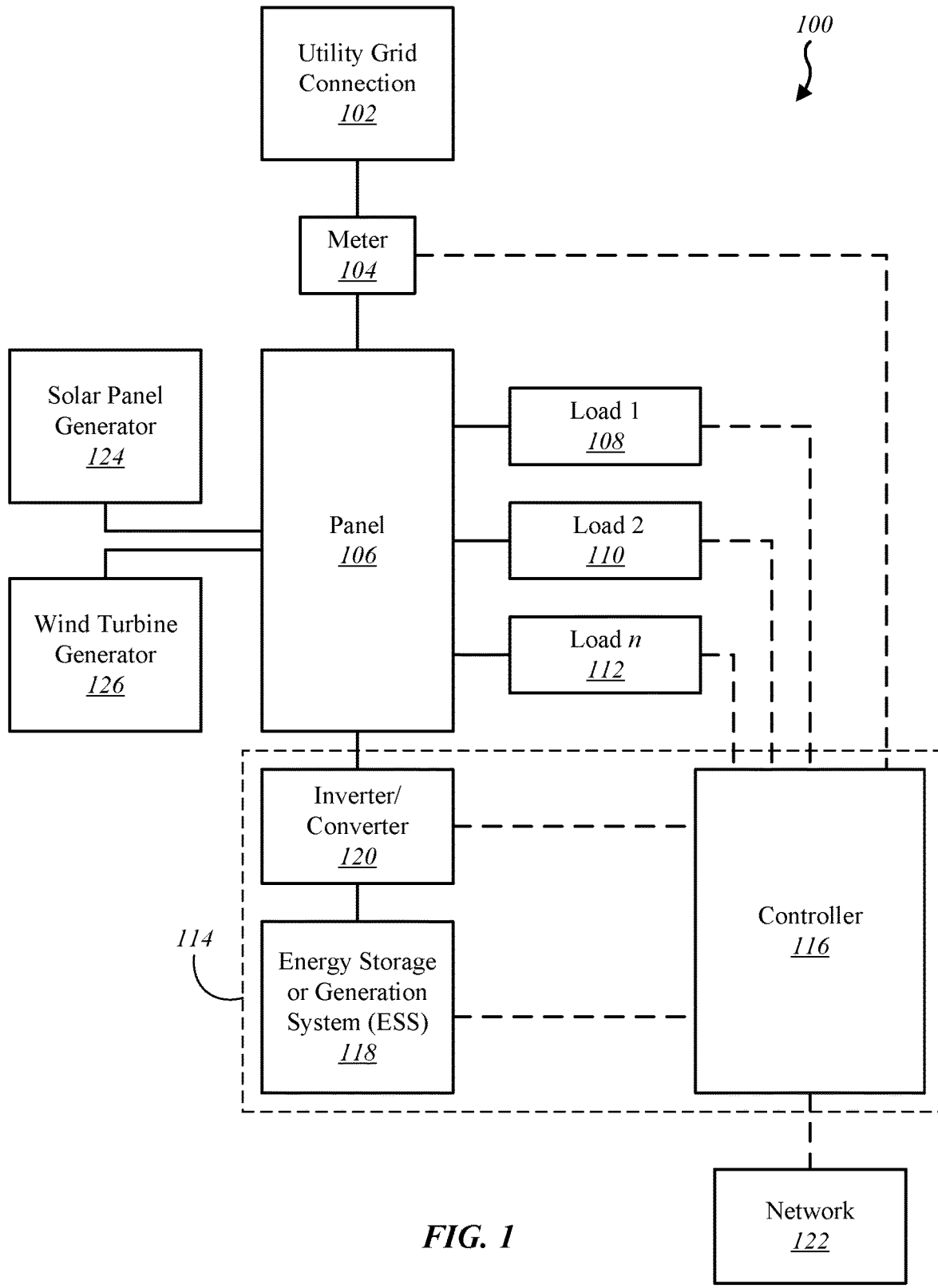
FIG. 1 is a block diagram of a customer site according to an embodiment of the present systems and methods.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to a method and system for generating a probability assessment for peak demand reduction for a utility customer using a conditional-output energy generator. As used herein, "peak demand reduction" refers to reducing customers' peak demand levels (e.g., in kilowatts (kW)) that are recorded over short divisions of time within a utility billing period. These peak demand levels may be used to assess a "peak demand charge" for that billing period that is directly related to the highest magnitude of peak demand level recorded during the billing period. Thus, these processes may be differentiated from other types of peak management, such as processes that are used to generally reduce consumption of a utility customer during "peak" time periods when electrical service is more expensive or scarce.

A conditional-output or variable-output energy generator may alternatively be referred to as an intermittent generator. These generators may have unpredictable output over short periods of time or output that is dependent upon conditions (e.g., weather conditions) that are generally unpredictable over short periods of time. Some example generators are solar/photovoltaic (PV) panel generator and wind-based turbines.

Aspects of the present methods and systems may allow a user to generate a demand reduction probability distribution curve for the customer's site based on that customer's historical usage, the type of conditional-output energy generator used, and historical performance of energy generators similar to the customer's generator. The demand reduction probability distribution curve may be determined by performing a simulation using historical consumption data distribution curves and historical generator production distribution curves to generate a net demand distribution curve for each time interval of a plurality of time intervals in one or more billing periods. In one embodiment, the simulation is a Monte Carlo simulation. A peak demand reduction system or consumption management system (CMS) may then be simulated as operating on the data of the net demand distribution curve to generate the probability that peak demand will be reduced by a certain amount for each data point in the net demand distribution curve. Aggregating and plotting the frequency of these post-CMS net demand values may provide the demand reduction probability distribution curve.

As used herein, a Monte Carlo simulation may be defined as a computer-assisted simulation that obtains numerical results by repeated random sampling. A Monte Carlo method may be used for simulating systems with many degrees of freedom or phenomena with significant uncertainty, such as fluctuating weather conditions or inconsistent electricity consumption values. In one example, a Monte Carlo simulation may comprise simulating the net demand of the site a by randomly sampling customer consumption values and customer generator production values a large number of times and determining the frequency or probability at which the resultant net demand values occur by comparing the simulated net demand values to each other.

The demand reduction probability distribution curve may be used by financiers or insurers of generators and other interested parties to price the risk of a generator not providing a specific amount of production and thereby causing a peak demand charge to be assessed (or to increase). This may be done using an insurance premium approach. The insurance premium may provide insurance against increased peak demand charges that are a result of unpredictable conditions affecting intermittent generator production. In an example method, an insurance premium may be covered by a portion of the value delivered by the solar or wind system. Thus, an insurer or other part may determine if an energy storage system (e.g., in a consumption management system (CMS)) can be deployed for a lower cost than the insurance premium in order to guarantee the value of peak demand reduction. If so, the CMS or other system may be treated as being economically viable.

Project portfolios can then be amassed based on hedging quantitatively-assessed risks across multiple sites in a manner akin to how an insurance provider builds a project portfolio for car or home insurance. Also, an intermittent generator provider may price the value of peak demand reduction inherently provided by its generators into its financed systems, even though the generators are, by nature, unpredictable. A generator provider may also gain the ability to propose the probability of a generator achieving specific values of peak demand charge savings to a customer under a cash purchase. In most cases, the unpredictability of an intermittent generator may not be completely eliminated, but performance of the present systems and methods may, at a minimum, reduce risk of generator purchasers, financiers, and insurers and provide a more comprehensive understanding of the risks of using these generators to reduce peak demand charges.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, and/or add other procedures or components as appropriate. For instance, the methods described may be performed in an order different from that described, and various steps may be added, omitted, and/or combined. Also, features described with respect to certain embodiments may be combined in other embodiments.

Referring now to the figures in detail, FIG. 1 shows a block diagram of an example customer site 100 according to an embodiment of the present disclosure. The customer site 100 may be connected to a utility grid connection 102 via a utility consumption meter 104. The meter 104 may be connected to a load panel 106 or other internal routing circuits of the site 100. Loads 108, 110, 112 of the site may be connected to the panel 106. The three loads 108, 110, 112 are representative of all loads at the site 100 that are metered by the meter 104. Thus, the loads 108, 110, 112 are individually labeled load 1 108, load 2 110, and load n 112 to show that a plurality of loads (e.g., n loads) may be operated at the site 100 and connected to the panel 106.

A consumption management system (CMS) 114 is diagrammatically shown in FIG. 1 as well. The CMS 114 may comprise multiple components, such as, for example, a controller 116 or other computer control system, an energy storage and/or generation system (ESS) 118, and an inverter and/or converter system 120 connecting the ESS 118 to the panel 106. The controller 116 may be connected to a network 122 (e.g., a local area network (LAN), wide area network (WAN), or the Internet) through an external connection.

The ESS 118 may comprise one or more of a battery system (i.e., an electrical energy storage battery) and/or a generator system (e.g., a gas-powered generator or fuel cell). The ESS 118 may therefore be a source of electrical energy that may be used by loads 108, 110, 112 at the site 100 when consumption of the energy of the ESS 118 is permitted by the controller 116. The ESS 118 may have specifications such as a battery capacity (e.g., in kilowatt-hours (kWh)), battery voltage, battery current, state of charge, and other related characteristics.

When possible, the ESS 118 may be charged by the utility grid connection 102 by drawing power through the meter 104 and may be controlled to discharge energy to the panel 106 generally, to loads 108, 110, 112 individually or in groups, or to the utility grid connection 102 specifically. Typically, the CMS 114 is used for peak demand spike mitigation purposes, and for that function the ESS 118 may provide power to the loads 108, 110, 112 or panel 106 in order to prevent the meter 104 from recording consumption of the site that exceeds a threshold that may be referred to as a "setpoint" for the CMS 114. When energy from the ESS 118 is used by the loads 108, 110, 112, the meter 104 records less energy being drawn from the utility grid connection 102, so the registered "peak" in consumption is eliminated or reduced.

Many utility service providers assess peak demand charges based on the highest average consumption recorded over a relatively short period of time that is a subdivision of a billing period. For example, a peak demand charge may be based on the highest metered power draw of the customer averaged over one 15-minute period out of all of the averaged 15-minute periods in the billing cycle. Other utility providers may assess peak demand charges based on the highest instantaneous power draw of a customer at any time during a billing period. Thus, the systems and methods disclosed herein may be adapted and configured to manage consumption of the customer in a manner that corresponds with the practices of the utility provider. This may differ from a "peak" defined by utility providers that refers to "peak hours" of the day or "peak seasons" in which prices for energy are higher than other times. A peak demand charge, as defined herein, may be based on a spike or peak in demand that happens to occur during "peak hours" or a "peak season," but the peak demand charge itself is determined based on the magnitude of the peak or the magnitude of the average of the peak subdivision of the billing period rather than being based on the time of day or year when it occurs.

Still referring to FIG. 1, the inverter and/or converter system 120 may comprise electronics configured to connect the ESS 118 to the electrical panel 106 and or other electrical interfaces at the site 100. Thus, the inverter and/or converter system 120 may adapt the output of the ESS 118 for providing energy to the panel 106 or other interfaces at the site 100. The inverter and/or converter system 120 may therefore comprise inverters such as AC-DC or DC-AC inverters, converters such as DC-DC converters, step-up or step-down converters, and related conversion equipment. The inverter and/or converter system 120 may also comprise specifications such as a minimum and maximum power output or rate of energy transfer from the ESS 118.

The controller 116 may be a computer system configured to receive information from the meter 104, loads 108, 110, 112, ESS 118, inverter and/or converter system 120, and/or a network 122. The controller 116 may monitor the metered load of the site to determine when to discharge the ESS 118 via the inverter and/or converter system 120 to prevent the metered load from exceeding a CMS setpoint during a billing cycle. To do so, the controller 116 may be programmed to predict future consumption of the site in order to improve the cost-effectiveness of discharge events. For example, a controller 116 may control discharging the ESS 118 with respect to the state of charge of the ESS 118 so that the state of charge of the ESS 118 does not drop so low that an expected upcoming peak cannot be mitigated by the CMS 114. In order to predict future consumption, the controller 116 may record historical consumption at the site and track trends and patterns that occur at the site over time. The controller 116 may also access a database of historical consumption information.

The solar panel generator 124 and wind turbine generator 126 are shown as example intermittent or conditional-output generators set up at the site. Other types of intermittent or conditional-output generators may be used as well. In FIG. 1, the generators 124, 126 are shown diagrammatically as blocks, but those having skill in the art will understand that linking components, converters, wiring, and other components may be implemented with these generators 124, 126 to make them compatibly connect to the panel 106. In some embodiments, only one type of generator is implemented. These generators 124, 126 may be connected to the panel 106 and their energy generated may contribute to the overall net consumption of the site that is measured by the meter 104. Also, the generators 124, 126 may be connected at different locations than the panel 106, such as to a load (e.g., 108) or between the panel 106 and meter 104. Consumption of the loads 108, 110, 112 at the site may be mitigated by energy produced by the generators 124, 126 and/or by discharging the ESS 118 via the inverter and/or converter system 120. The amount of power contributed by the generators 124, 126 may be conditional or intermittent based on meteorological conditions or other conditions that are unpredictable over the span of a peak-demand-charge-measuring subdivision of a billing period.

The system at the customer site 100 of FIG. 1 is an example implementation of a system having a conditional-output energy generator (e.g., generator 124 or 126) and a consumption management system (e.g., ESS 118). In some embodiments, the generator(s) 124, 126 may be referred to as being part of the CMS 114.

Figure 2:
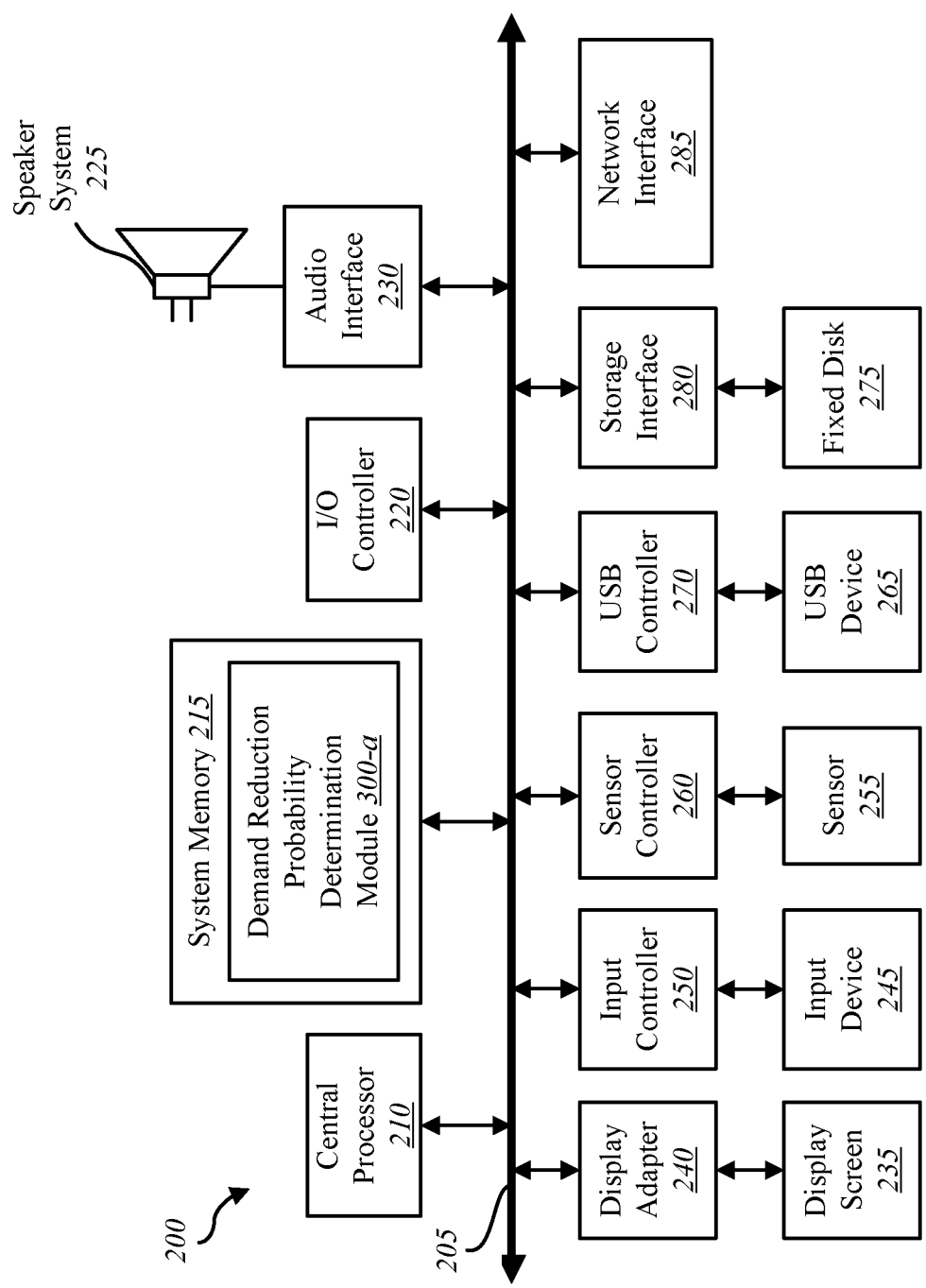
FIG. 2 is a block circuit diagram of a computing system according to an embodiment of the present systems and methods.

FIG. 2 is a block diagram of a computer system 200 that may be used to implement the present systems and methods for calculating demand reduction probability for a customer having a CMS and a conditional-output energy generator. Computer system 200 includes a bus 205 which interconnects major subsystems of computer system 200, such as a central processor 210, a system memory 215 (typically RAM, but which may also include ROM, flash RAM, or the like), an input/output controller 220, an external audio device, such as a speaker system 225 via an audio output interface 230, an external device, such as a display screen 235 via display adapter 240, an input device 245 (e.g., a keyboard, touchscreen, etc.) (interfaced with an input controller 250), a sensor 255 (interfaced with a sensor controller 260), one or more universal serial bus (USB) device 265 (interfaced with a USB controller 270), and a storage interface 280 linking to a fixed disk 275. A network interface 285 is also included and coupled directly to bus 205.

Bus 205 allows data communication between central processor 210 and system memory 215, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output System (BIOS) which controls basic hardware operation such as the interaction with peripheral components or devices. For example, computer-readable instructions of a peak demand reduction probability determination module 300-$a$ which may implement the present systems and methods may be stored within the system memory 215. Applications resident with computer system 200 are generally stored on and accessed via a non-transitory computer readable medium, such as a hard disk drive (e.g., fixed disk drive 275), an optical drive (e.g., an optical drive that is part of a USB device 265 or that connects to storage interface 280), or other storage medium. Additionally, applications can be in the form of electronic signals modulated in accordance with application and data communication technology when accessed via network interface 285.

Storage interface 280, as with the other storage interfaces of computer system 200, can connect to a standard computer readable medium for storage and/or retrieval of information, such as a fixed disk drive 275. Fixed disk drive 275 may be a part of computer system 200 or may be separate and accessed through other interface systems. A modem connected to the network interface 285 may provide a direct connection to a remote server via a telephone link or to the Internet via an internet service provider (ISP). Network interface 285 may provide a direct connection to a remote server via a direct network link to the Internet via a POP (point of presence). Network interface 285 may provide such connection using wireless techniques, including digital cellular telephone connection, Cellular Digital Packet Data (CDPD) connection, digital satellite data connection or the like.

Many other devices or subsystems (not shown) may be connected in a similar manner. Conversely, all of the devices shown in FIG. 2 need not be present to practice the present systems and methods. The devices and subsystems can be interconnected in different ways from that shown in FIG. 2. The operation of a computer system such as that shown in FIG. 2 is readily known in the art and is not discussed in detail in this application. Code to implement the present disclosure can be stored in a non-transitory computer-readable medium such as one or more of system memory 215, or fixed disk 275. The operating system provided on computer system 200 may be MS-DOS®, MS-WINDOWS®, OS/2®, UNIX®, MAC OS X®, Linux®, or another known operating system.

Figure 3:
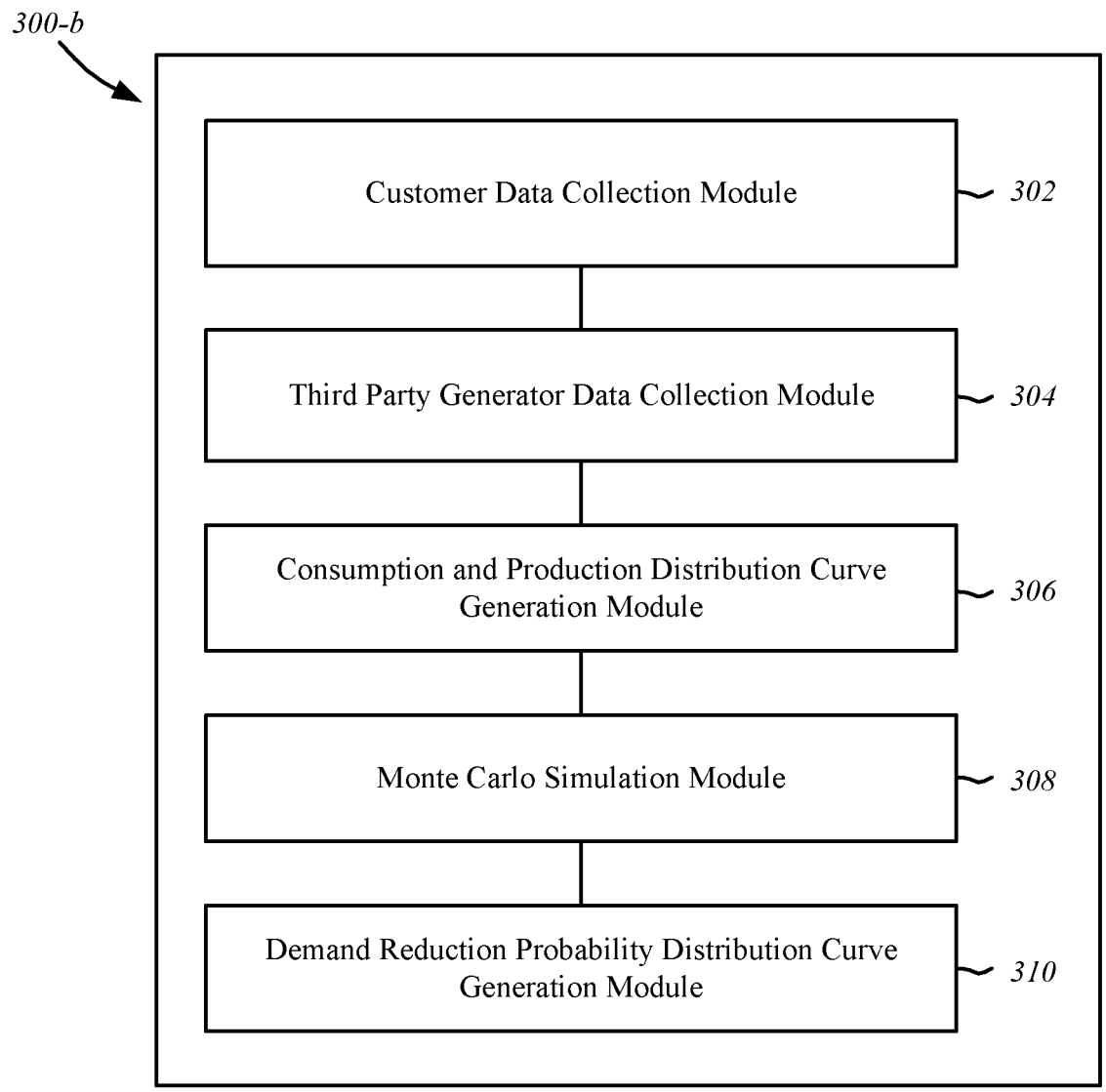
FIG. 3 is a block diagram of a module for implementing embodiments of the present systems and methods.

A peak demand reduction probability determination module 300-b is diagrammatically shown in FIG. 3. The peak demand reduction probability determination module 300-b includes several modules that operate as part of the overall module 300-b. Block 302 shows a customer data collection module, block 304 shows a third party generator data collection module, block 306 is a consumption and production distribution curve generation module 306, block 308 is a Monte Carlo simulation module, and block 310 is a demand reduction probability distribution curve generation module.

The customer data collection module 302 may be used to obtain or otherwise provide data about the customer. The data about the customer may be collectively referred to as a customer data set. Some of the information collected or obtained by the customer data collection module 302 may include meteorological data, data about the customer's intermittent/conditional-output generator, and historical customer consumption data. The meteorological data may comprise information about the weather in the geographic area of the customer. For example, this information may comprise at least an estimate of the solar irradiance of the customer's site, a frequency of cloud cover conditions that could interfere with the generation of electricity, patterns in winds in and around the customer site, average rainfall levels and times/dates, and other information about meteorological conditions that may affect the production ability of the customer's proposed generator.

The present systems and methods may be useful in situations where a customer is deciding whether to implement an intermittent generator or where a generator provider or insurer wishes to provide or insure an intermittent generator for the customer. In other cases, the systems and methods may be used when the generator provider wishes to guarantee a certain amount of peak demand reduction to a customer or other purchaser, financier, or insurer of the generator. Thus, the customer data collection module 302 may identify data about a customer intermittent generator. This data about the generator may include its rated output capacity and other electrical specifications and information about where on the customer's site the generator will be installed. For example, the information about where on the site it will be installed may be information about whether it will be on a rooftop, in a yard, or on a stand, whether the customer's site is on a hill or in a valley, and/or the generator's relative position to nearby other structures or other potential obstructions. This information may be gathered and recorded by customer data collection module 302 so that the proposed generator may be properly compared to third party generators that have their information gathered by the third party generator data collection module 304, as described in further detail below.

The customer data collection module 302 may also collect and store historical customer consumption data. The historical customer consumption data may comprise electrical consumption information about the customer over a period of time. For example, the customer data collection module 302 may gather or store load profile information of the customer. Load profile information may comprise grid-sourced electrical power consumption data correlated with timing information, such as a profile the magnitude of electricity consumption of the site from the utility grid over the course of several years. Using the load profile information, the peak demand reduction probability determination module 300-b may access information about the customer's consumption at a given time. For example, accessing the load profile information may allow the module to determine that the magnitude of the customer's consumption follows a certain pattern over a fifteen-minute period of time during each weekend of a given month. In another example, load profile information may be used to generate an average consumption distribution curve, as described in connection with FIG. 4A herein.

A plurality of time intervals may be defined by the peak demand reduction probability determination module 300-b. In some embodiments, these time intervals may correspond with the utility billing period's subdivisions that are used by the utility provider to assess peak demand charges. The utility provider may, for example, assess a peak demand charge based on the average demand that occurs during one subdivision of a billing period that is the highest average demand of all of the subdivisions in the billing period. Accordingly, the customer data collection module 302 may provide information that is detailed enough to provide at least these average demand values for each time interval defined by the peak demand reduction probability determination module 300-b. Preferably, the load profile information is specific enough that each billing period subdivision that is used for peak demand charge calculation has load profile information for short periods of time within that subdivision. Utility companies often assess peak demand charges based on the highest average demand of a plurality of 15-minute periods in a billing period, so the plurality of time intervals may match those 15-minute periods. Each subdivision may also have information for each one- or two-minute period of time within that subdivision that is used to obtain that subdivision's average demand.

In some cases, the customer data collection module 302 may access a database containing the customer's historical consumption information. The database may be prerecorded by the customer or may be obtained from a third party such as, for example, the customer's utility provider. In other embodiments, the customer data collection module 302 may use a measurement system to measure consumption information at the site. A measurement system may comprise sensors (e.g., ammeters, voltmeters, and other power sensors connected to sensor controller 260) and recording devices (e.g., computers) to track the total or metered consumption of the customer over time. The measured consumption values may be correlated with the time that the consumption takes place.

The third party generator data collection module 304 may collect, obtain, store, and/or provide information about third parties that have intermittent generators that may be comparable or converted to be comparable to the customer's proposed generator. This module 304 may therefore access a database of information about other customers or other users of such generators. The information about other customers may comprise location and meteorological information about those customers. Thus, the module 304 may collect information about customers and their generators that have a comparable location (e.g., a nearby regional location or latitude) or a comparable climate or meteorological conditions.

For example, if the proposed generator is to be installed in central Arizona then the third party information may include generator data for other generators in the same city, county, or state as the proposed generator and information about a dissimilar location may be excluded. Third party information from Maine could be excluded since it has dissimilar latitude to central Arizona, and information from a mountainous, heavily forested part of Arizona may be excluded for having significantly dissimilar weather conditions. Thus, the customer information gathered by the third party generator data collection module 304 may be about customers that have similar conditions to the customer of module 302 in order to better gauge the production abilities of a proposed generator for the customer of module 302.

The third party generator data collection module 304 may also retrieve or obtain data for other third parties that have generators that are comparable to the proposed generator for the customer of module 302. For example, the module 304 may retrieve or obtain production information for third party generators that have the same model, type, and/or capacity as the proposed generator. If the proposed generator is a solar panel, the third party generators may be solar panels that have characteristics such as a similar or identical size, model, age, or efficiency. If the proposed generator is a wind turbine, then solar panel information would be excluded, but similar or identical wind turbine information may be obtained or provided.

In another example, the production information may be collected by module 304 for third party generators that are positioned in locations that are comparable to the proposed generator's proposed location. If the proposed generator is to be positioned on a rooftop, third party generators may be identified that are also on rooftops. If the proposed generator is a solar generator that will be facing a certain direction, the third party generators may be selected that face that direction.

In some embodiments, third party generator data may be collected and converted or adapted to be similar to the proposed generator. Thus, although a third party generator may be a solar panel with a greater surface area and therefore higher capacity than a proposed generator for the customer, the generator data for that solar panel may be adapted to be similar to a proposed panel of the customer by determining its generator capacity per unit area and then adapting its production information to estimate what the proposed generator would produce for its given size and capacity per unit area. Similarly, if the third party generator faces a different direction than the proposed generator, the solar irradiance or wind direction may be converted to provide an estimate of the production it would provide if it faced the same direction as the proposed generator. In another example, the third party generator may be positioned in a location that only has comparable meteorological/weather conditions to the proposed generator for part of a year, so only the relevant generator data may be retrieved, or the comparable conditions may be used as a basis to extrapolate production data that would be produced if the weather conditions were the same as the customer's proposed generator site. As a result, third party generator data may be adapted and used even if it is not for generators identical to the customer's proposed generator. The plurality of intermittent generators of the third parties may have historical generator production data sets that meteorologically correspond with the customer's data set by being adapted to so correspond.

With a customer data set (including at least customer meteorological data, data about the proposed intermittent generator, and historical consumption data) and a plurality of historical generator production data sets for a plurality of intermittent generators (e.g., third party generators that meteorologically correspond with the customer data set), a plurality of time intervals may be defined in the customer data set and the plurality of historical generator production data sets. The time intervals may be defined by the consumption and production distribution curve generation module 306.

The time intervals may be the subdivisions of the billing periods used by the customer's utility provider. For example, the time intervals may be 15-minute increments throughout the data sets. Thus, the plurality of historical generator production data sets may comprise a set of production data for at least one third party generator for each span of time over a plurality of these time intervals. To illustrate, a third party generator's production may be identified on January 1, January 2, January 3, etc. from 12:00 p.m. to 12:15 p.m., 12:15 p.m. to 12:30 p.m., 12:30 p.m. to 12:45 p.m., etc. on each day. Days may also be categorized, such as being differentiated based on the type of day (e.g., weekend, weekday, holiday, days having a power outage, etc.) or the when that the day takes place (e.g., spring, summer, autumn, winter, the day after a power outage, etc.). Thus, time intervals for weekdays, weekends, or these other types of time divisions may be compared instead of just comparing specific dates (e.g., January 2) to other data for those specific dates (e.g., also January 2).

An additional set of information may be identified for each other third party generator of the plurality of intermittent generators being compared to the proposed customer generator. In this manner, the consumption and production distribution curve generation module 306 may be able to reference production data for one or more third party generators for a specific time interval. The time intervals may also be applied to the historical consumption load profiles of the customer's site that are obtained or produced by the customer data collection module.

Figure 4A:
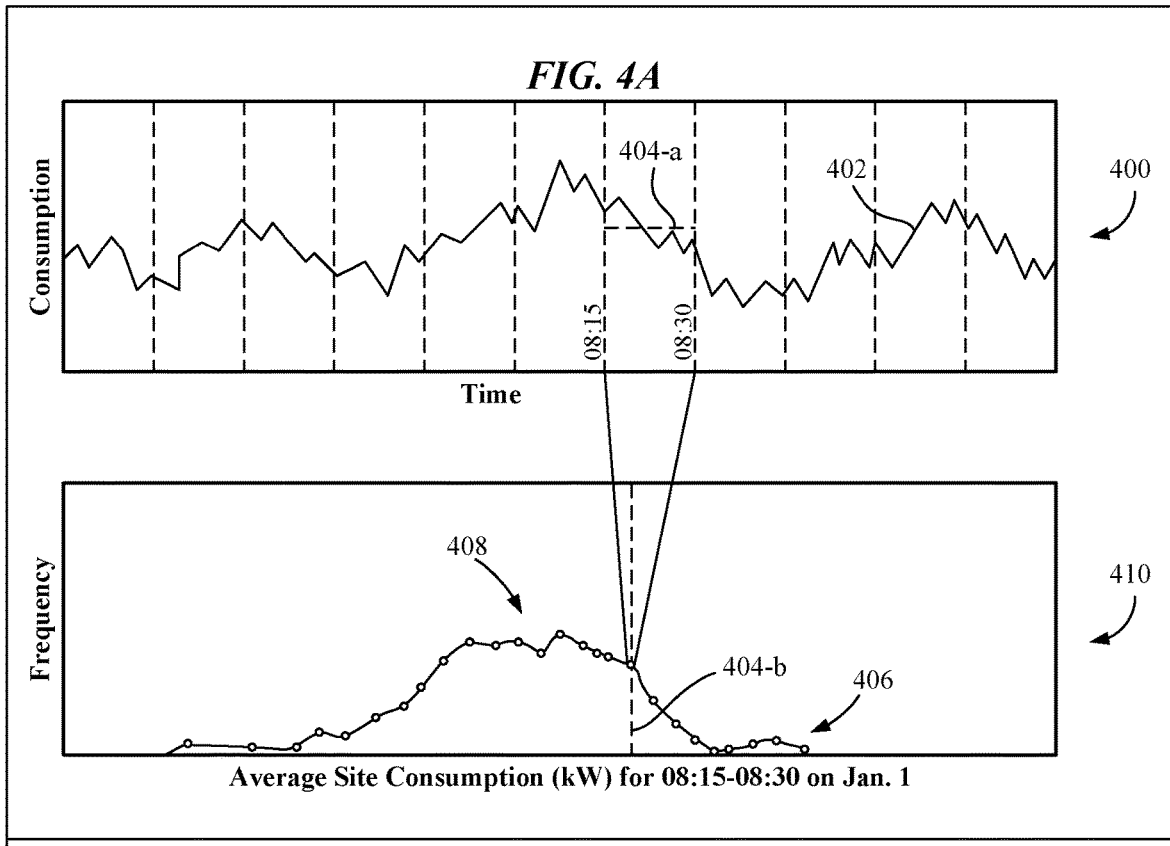
FIGS. 4A-4E illustrate load profiles and distribution curves that may be used to perform some embodiments of the present systems and methods.
Figure 4B:
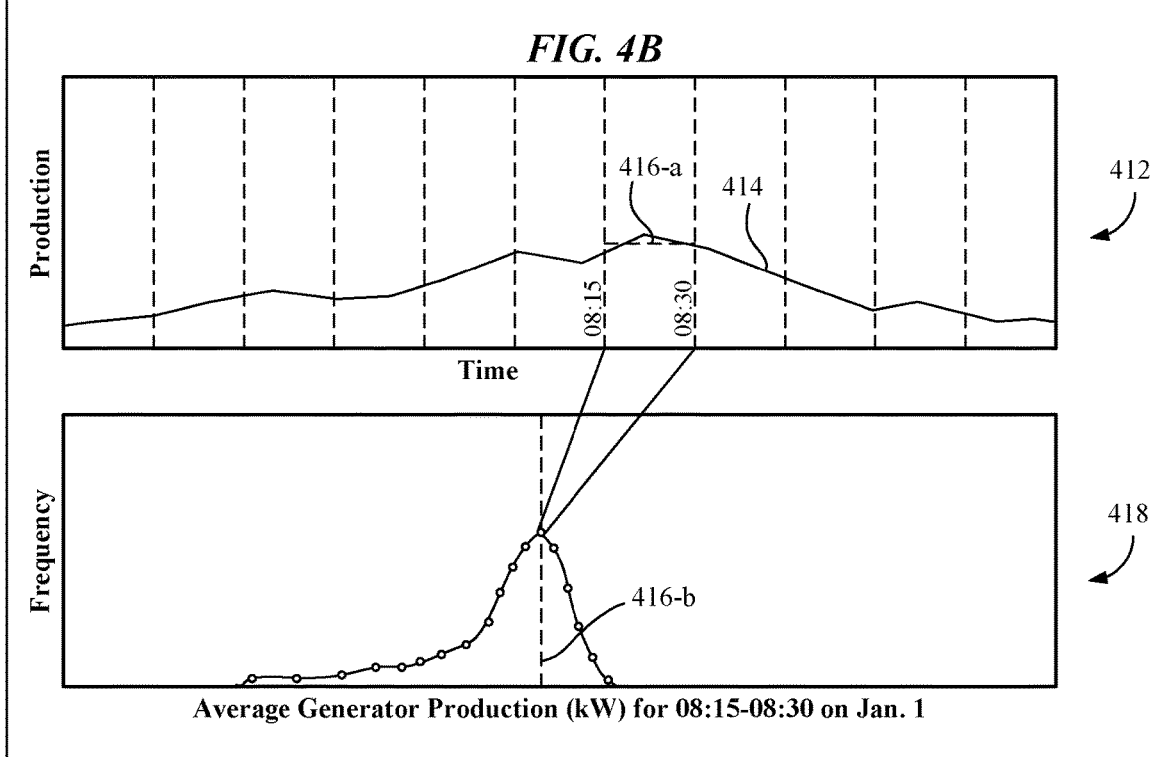

FIGS. 4A-4B show an example load profile and an example production profile in charts 400 and 412, respectively, to illustrate how the consumption and production distribution curve generation module 306 may function. The upper chart 400 of FIG. 4A shows a historical load profile 402 of a customer site that represents the consumption of the site over a period of time on a specific date, such as January 1. The time intervals are defined throughout that period of time and their bounds are indicated by the vertical broken lines. In this example, each time interval is a 15-minute period. The peak demand charge assessed to the customer may be determined based on the peak demand of those time intervals after the demand in each time interval is averaged.

Average consumption value 404-a of the interval between 08:15 and 08:30 is shown as an example.

The customer data collection module 302 may collect a large number (e.g., enough for a statistically significant sample) of load profiles for the customer's site. The load profiles may each have corresponding time intervals defined therein by the consumption and production distribution curve generation module 306. Thus, there may be a plurality of samples of average consumption values of the customer for a given time interval. For example, an average demand value may be determined for the time interval of 08:15-08:30 on January 1 over several years. The consumption and production distribution curve generation module 306 may then use these average demand values to generate a consumption distribution curve for each time interval. The lower chart 410 of FIG. 4A shows one such consumption distribution curve.

Chart 410 shows the frequency of certain average consumption values occurring for a given time interval (between 08:15 to 08:30 on a certain date, in this case). The average consumption value 404-a of chart 400 is shown in chart 410 as value 404-b to show where the average consumption of the specific load profile of chart 400 would fall in the chart 410 plot. Chart 410 shows that the consumption of load profile 402 between 08:15 to 08:30 on the date of load profile 402 is higher than most average consumption values for that time interval on that date. The average consumption 404-b also occurs more frequently than several higher average consumption values 406 and less frequently than several lower average consumption values 408.

The distribution of average consumption values in chart 410 may be referred to as an average consumption distribution curve for that time interval on that date. The consumption and production distribution curve generation module 306 may generate an average consumption distribution curve such as the one shown in chart 410 for each time interval over each date used in the present systems and methods. Thus, a large number of average consumption distribution curves may be generated to cover a long period of time (e.g., several months or a year).

The consumption and production distribution curve generation module 306 may also generate production distribution curves using the data collected by the third party generator data collection module 304. The upper chart 412 of FIG. 4B shows an example production profile 414 of an intermittent generator on a date, and the time intervals are indicated by the vertical broken lines therein. The average production 416-a over the time interval of 08:15-08:30 on that date is also shown. A plurality of these profiles may be used by the consumption and production distribution curve generation module 306 to generate a production distribution curve, as shown in the lower chart 418 of FIG. 4B. In some embodiments, a production distribution curve is generated for each intermittent generator for which data is collected by the third party generator data collection module 304. The production distribution curves for each intermittent generator for a given time period may also be combined into a single production distribution curve for that time period if the intermittent generators are similar to each other or are converted to be similar to each other (as described above).

The lower chart 418 of FIG. 4B shows that for the interval of 08:15 to 08:30 on the date of production profile 414, the average production 416-b (which corresponds with average production 416-a) was the most frequently recorded average production for that date. A distribution of average production values were recorded that were higher and lower than that average 416-b. Also, many intermittent generators recorded the same or nearly the same average production 416-b for that time interval. A large number of production distribution curves may be generated to cover time intervals that span a long period of time (e.g., several months or a year).

Figure 4C:
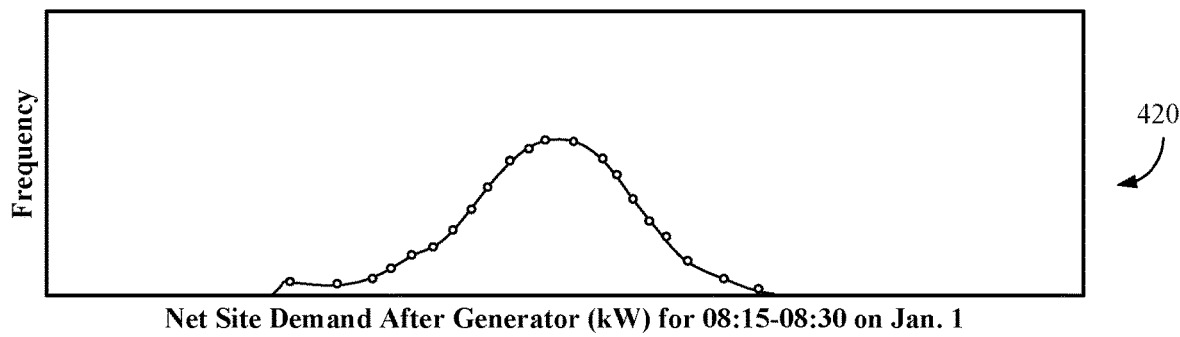

After the consumption and production distribution curve generation module 306 has generated a plurality of production distribution curves and a plurality of average consumption distribution curves, the Monte Carlo simulation module 308 may access those distribution curves to produce a net demand distribution curve for each time interval of the plurality of time intervals. To do so, the Monte Carlo simulation module 308 may generate a net demand value for each time interval on each date and then combine those net demand values into a net demand distribution curve. FIG. 4C shows an example net demand distribution curve in chart 420. A net demand distribution curve may alternatively be referred to as a metered demand curve or the net demand of the customer site after including the production of the generator.

Each net demand value may be calculated by the Monte Carlo simulation module 308 by sampling, at random, one of the average consumption values in the average consumption distribution curve of the time interval and sampling, at random, one of the average production values in the average production distribution curve(s) of the same time interval. These randomly sampled values respectively represent one possible average consumption value of the site and one possible average production value of a potential generator at the site for that time interval. Thus, the net demand value for those two random samples is the difference between the sampled consumption value and the sampled production value.

The Monte Carlo simulation module 308 may iterate and repeat the calculation of a net demand value for that time interval a plurality of times. For instance, the calculation may be repeated 1,000, 10,000, or 100,000 times for that time interval. The exact number of iterations may be determined by the end user in a manner sufficient to obtain a statistically significant representation of the net demand values in the net demand distribution curve produced by the Monte Carlo simulation module 308. Each iteration may provide one data point that is contributed to a net demand distribution curve for that time interval. An example net demand distribution curve for an example time (08:15 to 08:30 on January 1) is shown in chart 420 of FIG. 4C, wherein the frequency of net demand values is shown for each magnitude of net site demand values for the time interval in question.

The Monte Carlo simulation module 308 may then repeat the sampling for another time interval and generate a net demand distribution curve for that time interval. Eventually, the Monte Carlo simulation module 308 generates a net demand distribution curve for all time intervals previously defined by the consumption and production distribution curve generation module 306.

The net demand distribution curve for an interval indicates the frequency that each net demand value occurs for that interval. Over a large number of iterations, more commonly occurring average consumption and average production values will be sampled, so the frequency of net demand values in the net demand distribution curve will be higher for net demand values that are more likely to occur and lower for net demand values that are unlikely outliers. For example, as shown in chart 420 of FIG. 4C, the net demand values near the center of the chart 420 may occur more frequently than the peripheral net demand values. This information may be used to determine the probability that the net demand of the customer will be a certain value for that time interval. For example, in chart 420, it is more likely that a customer's site having a generator similar to the proposed generator will have a net site demand (i.e., metered demand) that is at a value near the center of the chart 420 than a value near to the periphery. The probability of each net demand value occurring may be calculated using the net demand distribution curve. Higher frequency of occurrence correlates with higher probability, so net demand values at peaks in the net demand distribution curve are more probable net demand values than net demand values at low points on the net demand distribution curve.

In some cases, the Monte Carlo simulation module 308 may improve the accuracy of a net demand distribution curve by performing additional steps prior to generating the net demand distribution curve. For example, in situations where there is not a large number of different average site consumption values in the average site consumption distribution curve, the Monte Carlo simulation module 308 may end up sampling a small number of average consumption values more frequently than would happen in a real-world scenario. Thus, the Monte Carlo simulation module 308 may perform an additional step of fitting a statistical curve to the average site consumption distribution curve in order to "fill in" gaps in the data and to avoid sampling anomalous average consumption values an inordinate number of times. For instance, the distribution curve of chart 410 may be replaced by a statistical curve shape (e.g., a bell curve or triangular curve) that is similar in size and shape to the distribution curve of chart 410. Upon replacing the distribution curve of chart 410, the Monte Carlo simulation module 308 may then reference the new "ideal" distribution curve as each iteration of the Monte Carlo simulation is performed. Because the new distribution curve has an idealized shape, it can have an unlimited number of potential values along the curve, so it is unlikely that certain average consumption values are sampled too frequently, particularly in the case of outlier values. Thus, a net demand distribution curve may be more accurate to real-world conditions than a limited initial data set of consumption values would be able to provide alone.

Furthermore, as the Monte Carlo simulation module 308 samples a distribution curve of a certain time period (e.g., from charts 410 or 418), the module 308 may generate sample values that are correlated against the values from distribution curves of time periods that occur before and/or after that certain time period using a "distribution-free" approach. For example, the module 308 may implement the "distribution-free" approach described in "A Distribution-Free Approach to Inducing Rank Correlation Among Input Variables," Ronald L. Iman, W. J. Conover, Communications in Statistics—Simulation and Computation, Vol. 11, Iss. 3, 1982, pp. 311-334, received: January 1981, published online: 27 Jun. 2007, which is hereby incorporated by reference in its entirety by this citation. Implementation of this process of correlating sample values may prevent the Monte Carlo simulation module 308 from referencing values that could not possibly occur in close succession, so the real-world accuracy of the net demand distribution curve may be improved.

In another embodiment, when the module 308 samples a distribution curve for a time period, the module 308 may evaluate whether that sample would be possible for the site in view of samples from the distribution curves of preceding and/or following time periods. If a sample for one distribution curve is taken from a low end of the bell curve (or other type of curve), samples from distribution curves at related times should not be taken from a high end of the bell curve since it is usually not realistic for the consumption to change from being a low-end outlier to a high-end outlier within short time intervals. The acceptable range of difference between samples may be determined empirically by the user. For instance, if the Monte Carlo simulation module 308 samples the average site consumption distribution curve to obtain an average value of 20 kW for the time period between 08:15 and 08:30 on January 1, the module 308 may also reference the average values sampled from the consumption distribution curves for the time periods of at least 08:00 to 08:15 and/or at least 08:30 to 08:45 to determine whether the 20 kW value should be used or not. If the average value sampled for 08:00 to 08:15 was 21 kW, the value for 08:15 to 08:30 may be deemed acceptable since 21 kW is within a range of values that could feasibly occur within a 15-minute period preceding the 20 kW value for 08:15 to 08:30. However, if the value sampled for the period starting at 08:00 was 200 kW, the module 308 may reject using the 20 kW sample since it would be impossible (or highly unlikely) that consumption changes so drastically between the two 15-minute time internals. Accordingly, if the 20 kW sample was rejected, the module may sample the distribution curve of 08:15 to 08:30 again until it finds a sample that is within a range of actually possible averages. By not using samples that are incongruous with samples from neighboring time intervals, a net demand distribution curve may be generated that more reasonably approximates actual net demand at a site.

Referring again to FIG. 3, block 310 is the demand reduction probability distribution curve generation module. This module 310 may be used to generate a demand reduction probability distribution curve for the customer's site by simulating operation of a peak demand reduction system operating at the site over each net demand value in the net demand distribution curve that is generated by the Monte Carlo simulation module 308. A peak demand reduction system may be a consumption management system (e.g., CMS 114) having an energy source (e.g., ESS 118). The module 308 may simulate one setpoint of the peak demand reduction system, or a plurality of setpoints may be simulated and tested. Distribution curves of the rates of failure of the peak demand reduction system (e.g., failure to prevent peak demand charge increases or failure to prevent a battery from reaching zero state of charge) may be accumulated to evaluate the effectiveness of various setpoints for the system. Similarly, the module 308 may simulate one battery capacity and/or intermittent generator size with the peak demand reduction system or may iterate using a Monte Carlo simulation to determine failure rates of a plurality of battery capacity sizes and/or intermittent generator sizes. See also FIGS. 6-7 and their related descriptions below.

A peak demand reduction system may reduce demand by distributing energy from the energy source 118 to the customer site in order to reduce the average net demand value for each time interval. Accordingly, the demand reduction probability distribution curve generation module 310 may, for each net demand value of each net demand distribution curve and for each time interval, simulate the operation of the peak demand reduction system in a manner that may further reduce the net demand values of the net demand distribution curves. The results may be referred to as a post-peak-demand-reduction-system net demand distribution curve, which may alternatively be referred to as a demand reduction probability distribution curve.

Figure 4D:
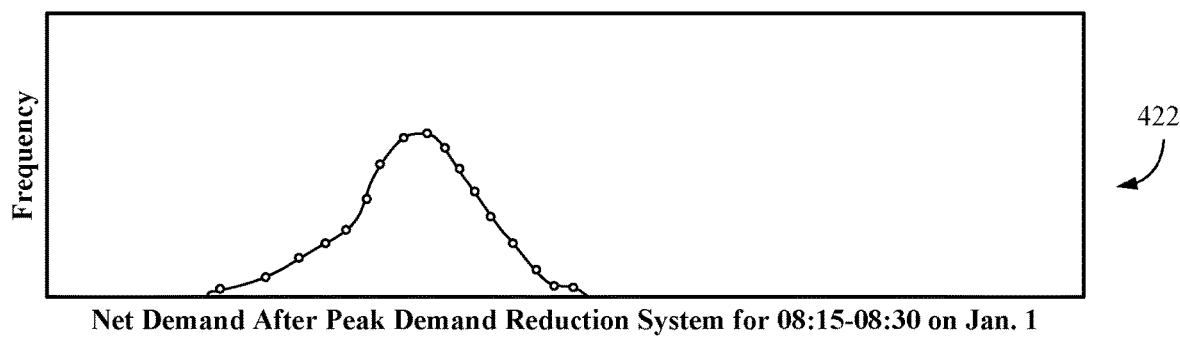

An example demand reduction probability distribution curve is shown in chart 422 of FIG. 4D. The net demand after using the peak demand reduction system is more likely to be lower than the net demand without using the peak demand reduction system, as shown by the mean values of the curves of charts 420 and 422 being offset relative to each other. There is also, however, a likelihood that the net demand is unchanged by the peak demand reduction system. For example, the peak demand reduction system may be unable to reduce demand by a great enough magnitude (such as by having an undersized inverter and/or converter system 120) or for a great enough period of time (such as by having an undersized ESS 118). Thus, analyzing these charts 420 and 422 may provide insight into the probability that a certain reduction in net demand will be produced by implementing a peak demand reduction system.

Using these distribution curves, the value of the peak demand reduction system may be estimated according to the amount of peak demand charge savings it is likely to provide in each time interval, particularly within time intervals of the billing period wherein the net demand after operation of the peak demand reduction system would result in the peak demand charge for that billing period. The value generated by operation of the peak demand reduction system may, however, be uncertain since not all simulated operations of the peak demand reduction system may result in a reduction of net demand, as evidenced by the overlap of the net demand values of charts 420 and 422. Thus, the value of the system may be a probability-weighted economic value wherein the system is assigned economic value based on the probability that it will be able to produce that value for the customer. In a simple example, a peak demand reduction system may be estimated to have a value of at least $12,000 in 20% of cases, a value of at least $9,000 in 50% of cases, and a value of at least $3,000 in the remaining 30% of cases. The peak demand reduction system may provide different levels of peak demand reduction under different conditions, and each set of conditions may be more or less likely to occur than others. The customer, financier, or insurer of the peak demand reduction system may therefore obtain a probability-based value of the system and decide whether to purchase or finance the system based on the customer's, financier's, or insurer's risk tolerance.

Figure 4E:
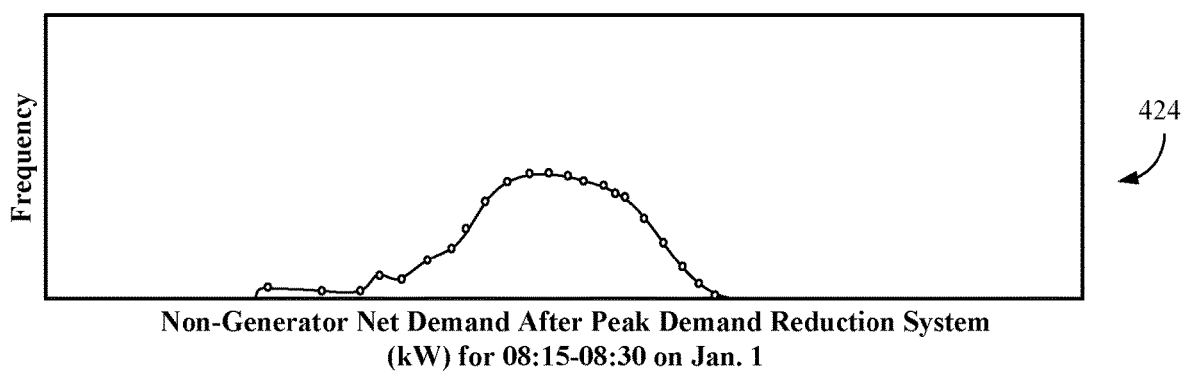

In some embodiments, a probability-weighted value of the proposed intermittent generator may also be evaluated using this information. For example, a non-generator net demand distribution curve may be generated for each time interval by simulating operation of a peak demand reduction system to the average consumption distribution curve (e.g., the one shown in chart 410) for each time interval. An example non-generator net demand distribution curve is shown in chart 424 of FIG. 4E. The probability information inherent in the non-generator net demand distribution curve may be compared to the information in the demand reduction probability distribution curve for each time interval to determine the probability that a different net demand will be produced using the proposed intermittent generator as opposed to not using the proposed intermittent generator. Again, these curves may overlap, so there is a probability that using the generator will cause no change in the net demand, but the customer, financier, or insurer will be able to gauge the likelihood of each value being realized by the intermittent generator and act according to their best economic interests.

The probability of each peak demand reduction value (whether it is determined by simulating use of a generator or not) may be guaranteed by a party providing the intermittent generator and/or peak demand reduction system. For example, the party may guarantee that in 90 percent of cases the peak demand reduction system will produce 2.5 kilowatts of peak demand reduction alongside an intermittent generator in a given billing period or that in 85 percent of cases the intermittent generator will produce 1.2 kilowatts of peak demand reduction in a given billing period. Conventionally, this type of probabilistic guarantee would be impossible due to the unpredictable output of the intermittent generator, but the aggregation of information and the evaluation of that information over a plurality of possible scenarios using the Monte Carlo simulation in the current methods and systems allows additional insight into the performance of consumption management and generation systems in ways not currently available. Furthermore, even with a limited amount of data about the customer's consumption or third party generators' production, a more accurate financial risk assessment can be produced using the present systems and methods than would be possible using conventional means.

Figure 5:
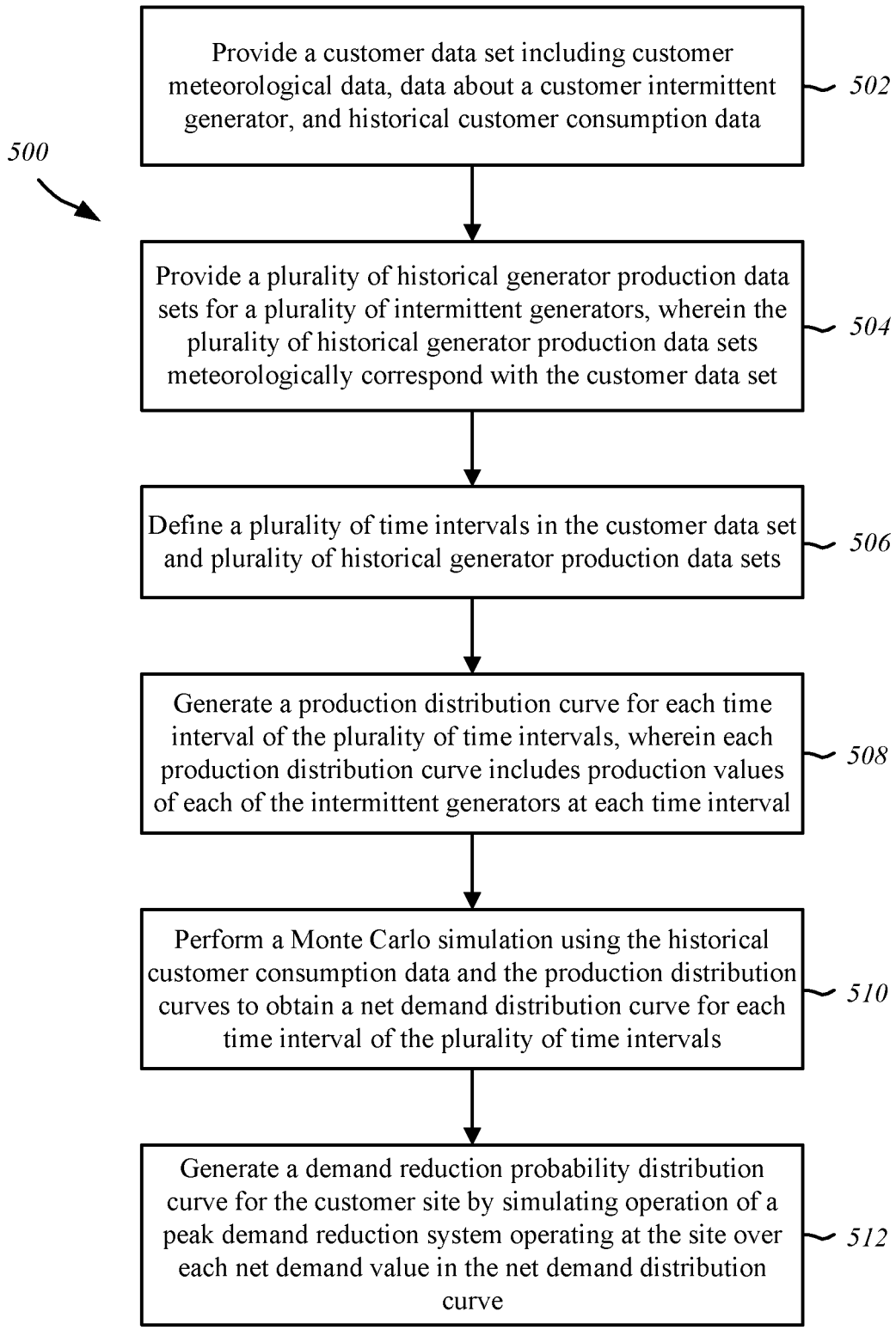
FIG. 5 is a flowchart showing a process according to an embodiment of the present systems and methods.

Referring now to FIG. 5, a flowchart of a process 500 according to the present systems and methods is shown. In block 502, the process 500 may include providing a customer data set including customer meteorological data, data about a customer intermittent generator, and historical customer consumption data. This block 502 may be performed by the customer data collection module 302 of FIG. 3.

Next, the process 500 may include providing a plurality of historical generator production data sets for a plurality of intermittent generators, wherein the plurality of historical generator production data sets meteorologically correspond with the customer data set, as shown in block 504. This block 504 may be performed by the third party generator data collection module 304.

Block 506 may include defining a plurality of time intervals in the customer data set and plurality of historical generator production data sets. As mentioned above, this block 506 may be performed by the consumption and production distribution curve generation module 306 or the modules of blocks 302 and 304 of FIG. 3.

Module 306 may also perform block 508, wherein a production distribution curve for each time interval of the plurality of time intervals is generated. Each production distribution curve may include production values of each of the intermittent generators at each time interval.

Next, in block 510, a Monte Carlo simulation may be performed using the historical customer consumption data and the production distribution curves to obtain a net demand distribution curve for each time interval of the plurality of time intervals. The Monte Carlo simulation module 308 may perform this function.

Finally, in block 512, the process 500 may include generating a demand reduction probability distribution curve for the customer site by simulating operation of a peak demand reduction system operating at the site over each net demand value in the net demand distribution curve. The block 512 may be performed by the demand reduction probability distribution curve generation module 310.

In some embodiments, the process 500 may further include determining a threshold demand reduction value using the demand reduction probability distribution curve. A threshold demand reduction value may be a target value that the peak demand reduction system is designed to achieve. For example, the peak demand reduction system may be designed to provide 5 kilowatts of demand reduction to avoid a peak demand charge that would otherwise result from consumption of 5 kilowatts above a target magnitude.

The threshold demand reduction value may be determined by evaluating the average consumption distribution curve (e.g., as shown in FIG. 4A) and determining the cost of the peak demand reduction system per unit of peak demand reduction possible by that peak demand reduction system. The threshold demand reduction value may be at the point where the cost of the peak demand reduction system gives diminishing returns on the peak demand reduction possible. The threshold demand reduction value may therefore correspond with a peak demand reduction system that, in the eyes of the consumer, financier, or insurer, best provides that threshold demand reduction value based on their budget for the system and their risk tolerance.

The process 500 may also include implementing a peak demand reduction system designed to provide the threshold demand reduction value. A peak demand reduction system may be implemented by providing the components to the peak demand reduction system (e.g., the components of the CMS 114 of FIG. 1) and/or installing the components at the customer's location. For example, a CMS 114 may be provided to the customer and may be connected to the customer's panel 106 and loads 108, 110, 112. The proposed customer intermittent generator may be included as part of the peak demand reduction system. Thus, the proposed generator may be connected to the panel 106 as well, as indicated by generators 124, 126 of FIG. 1.

In some cases, methods of the present disclosure may include steps to insure against peak demand charges that are caused by intermittent high-demand devices or appliances installed at the customer's site. Thus, devices such as electric vehicle (EV) chargers or heating, ventilation, and air conditioning (HVAC) units that often cause spikes in consumption may be implemented based on an insurance premium approach that allows the customer to pay a premium to have these devices installed at the site while avoiding any increased peak demand charges that may result from their operation. For example, the present systems and methods may be applied to determine an average consumption distribution curve of the site in general such as the curve of chart 410 (without the device/appliance installed) for a plurality of time intervals and a device or appliance consumption distribution curve that gives the frequency of the consumption of the device or appliance for each time interval (based on a collection of historical load profiles of the device or appliance or similar devices or appliances). An appliance consumption distribution curve may resemble chart 418, but for average appliance consumption rather than average generator production.

A net demand distribution curve (such as chart 420) may then be generated based on the average consumption distribution curve and the device or appliance consumption distribution curve that represents the likely net demand of the site while using the device or appliance. Then, by referencing the net demand, the probability or frequency of the site exceeding a peak demand charge inducing value may be calculated, and financiers or insurers of the customer may determine the risk of incurring raised peak demand charges based on the operation of the device or appliance and assign financial value (e.g., insurance premiums) accordingly.

One way that financial value may be assigned to an intermittent generator is related to the generator's ability to reduce peak demand charges. Using the present systems and methods, a production distribution curve may be generated for time intervals of a billing period. Because the production distribution curve indicates the expected range of production values for a given time interval, the user may accordingly convert those expected production values into peak demand charge values. For example, if a generator frequently generates 200 watts of power during a given time interval and 200 watts is equivalent to an increase in a peak demand charge for that interval of $80.00, the user may convert the expected production value (200 watts) into a financial value ($80.00). However, it would be incorrect to say that the generator will always produce $80.00 worth of value for that time period since, in other cases, the generator may produce more or less than 200 watts. Thus, the financial value of the generator may be conditional or related to a probability/confidence factor. Therefore, a financial value distribution curve may be determined for the generator. Interested parties (owners, financiers, or insurers) may use the financial value distribution curve to gauge the likelihood that the generator will produce a certain economic value for the customer.

In one embodiment, an insurer may offer to provide insurance to the customer that protects the customer from unexpected spikes in the peak demand charge that are the result of unpredictable conditions affecting the production of the generator. For example, the customer may operate the intermittent generator and the insurer may require the customer to pay an insurance premium to the insurer. The insurer then agrees to cover, for the customer, the cost of a peak demand charge that results from the generator failing to produce a sufficient amount of energy to mitigate a peak demand charge from occurring. In some cases the insurer and consumer may agree that a portion of a peak demand charge that exceeds a specified limit is to be covered by the insurer. The insurer may wish to offer this kind of policy to the customer when the premiums received by the insurer are more likely to compensate for the risk of paying a peak demand charge for the customer, as determined by referencing the financial value distribution curve or production distribution curve of the generator. The customer may wish to accept such a policy as well to avoid being responsible for unexpected peak demand charges that result from weather conditions or other unpredictable phenomena. Generally, the customer may be offered a policy when the financial value usually produced by the generator exceeds the cost of the insurance premium. In this way, the customer is able to obtain value from the generator and the insurance provider is able to obtain value from the generator producing consistently.

Thus, in one aspect of the present disclosure, a method of insuring an intermittent generator of a customer at a customer site is disclosed. The method may comprise determining a production distribution curve of the intermittent generator, referencing the production distribution curve to determine a risk of the intermittent generator failing to provide a threshold amount of power to the site, and insuring the customer against the intermittent generator failing to provide the threshold amount of power to the site.

This method may also include determining a financial value of the risk and assessing an insurance premium to the customer, wherein the insurance premium is based on the financial value of the risk. Additionally, the method may include determining an expected value of the production of the generator by assigning financial value to the production distribution curve, wherein the insurance premium is less than a frequent expected value of the production of the generator. Insuring the customer may comprise paying at least a portion of a peak demand charge for the customer when the intermittent generator fails to provide the threshold amount of power to the site. In at least one embodiment, the portion of the peak demand charge is the portion resulting from the intermittent generator failing to provide the threshold amount of power to the site. This method may also be implemented as steps performed by a processor, wherein the method is stored in a non-transitory computer-readable storage medium or the processor is part of a computing device configured to perform the above steps of the method.

In some cases, the net demand of the site in general (without the device or appliance) may be the net demand while operating with a peak demand reduction system at the site and the net demand of the site while using the device or appliance may also reflect the operation of the peak demand reduction system. A peak demand reduction system may be designed to counteract and limit the peak demand charge inducing value from increasing due to the operation of the device or appliance.

Figure 6:
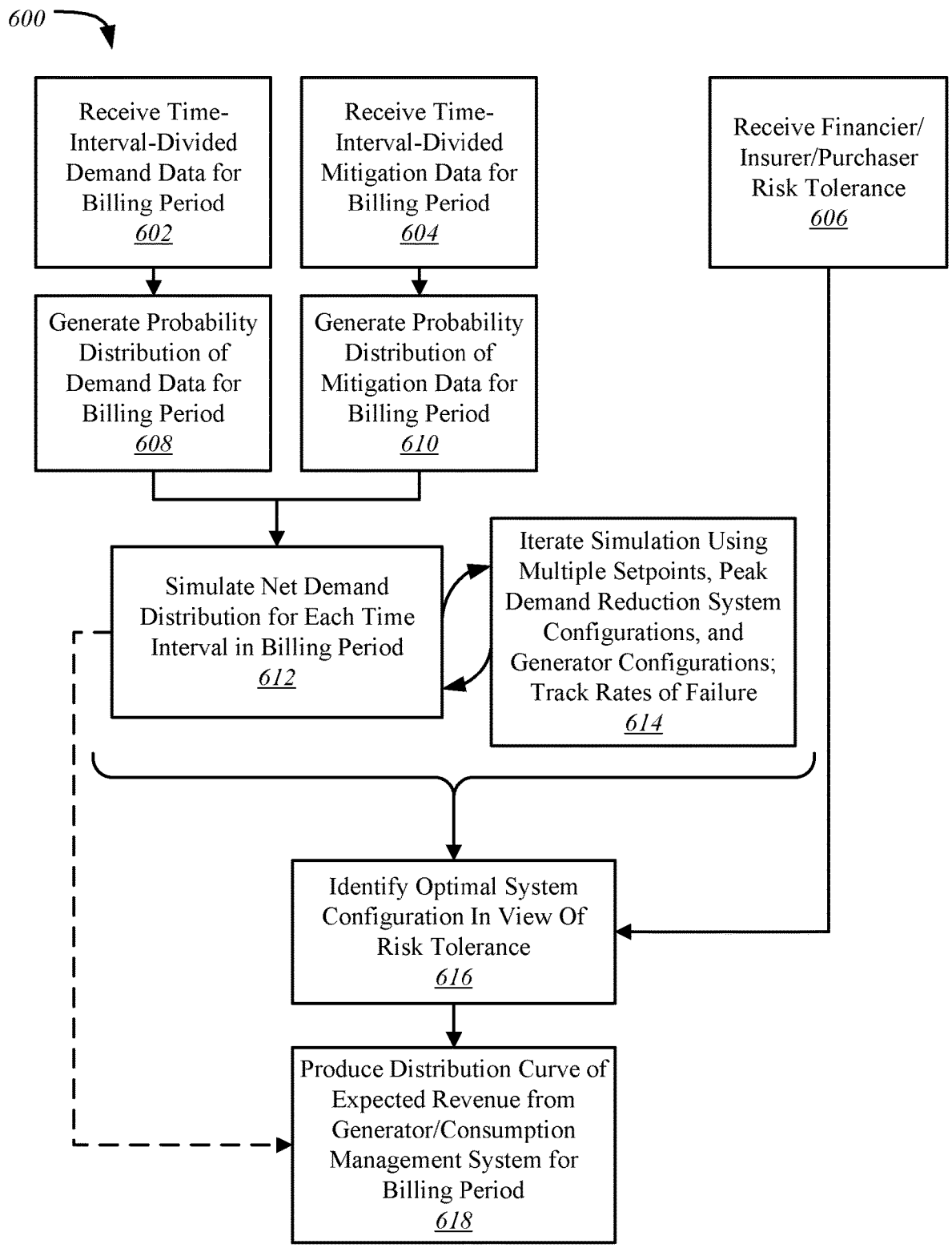
FIG. 6 is a flowchart showing another process according to an embodiment of the present systems and methods.
Figure 7:
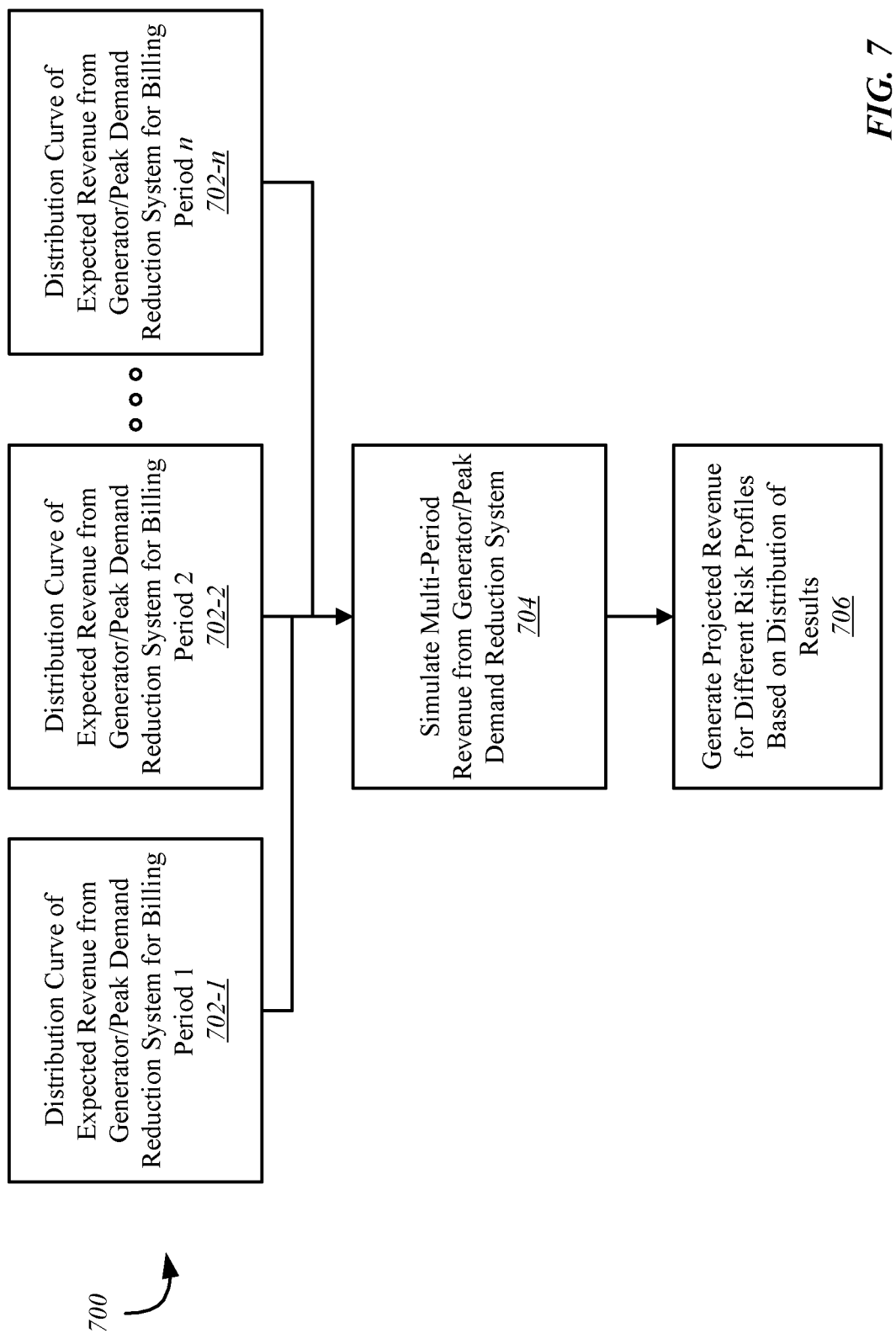
FIG. 7 is a flowchart showing another process according to an embodiment of the present systems and methods.

FIGS. 6-7 show features of additional methods for determining expected revenue from an intermittent generator and/or peak demand reduction system at a site. The process flowchart of FIG. 6 illustrates one such method 600. The method 600 may include receiving time-interval-divided demand data (block 602) and time-interval-divided mitigation data (block 604) for a billing period. The demand and mitigation data may be divided into time intervals such as the intervals discussed above in connection with modules 302-306. Thus, the demand data (i.e., consumption data) of the site may be received and divided into time intervals (e.g., 15-minute intervals) that are associated with calculation of a peak demand charge. The time-interval-divided mitigation data may represent the amount of energy provided to the site in each time interval of the billing period by an intermittent generator and/or peak demand reduction system. For example, the mitigation data may include the amount of energy produced by an intermittent generator in each time interval and/or the energy provided to the site by a battery in a peak demand reduction system that is provided to offset consumption.

The billing period may be the period of time associated with the calculation of the peak demand charge, such as a span of time including many of the above time intervals (e.g., a month). Thus, for 15-minute time intervals, 2880 consumption data intervals may be received in block 602 and 2880 mitigation data intervals may be received in block 604 for each billing period of 30 days. The demand and mitigation data of these blocks 602, 604 may also be accumulated for many billing periods. In FIG. 6, for example, blocks 602 and 604 may only receive data associated with one specific billing period (e.g., only the month of April) over several cycles of that billing period (e.g., April 2015, April 2014, April 2013, etc.).

The method 600 may also include receiving a risk tolerance of a financier, insurer, or purchaser of the generator and/or peak demand reduction system in block 606. The risk tolerance may comprise, for example, information about that party's budget, its ability to cover unexpected peak demand charges, its perceived likelihood of encountering peaks in consumption that cannot be mitigated by the generator and peak demand reduction system, and/or acceptable failure rates of the intermittent generator and/or peak demand reduction system.

In block 608, the method 600 includes generating a probability distribution of demand data for the billing period. For example, a distribution curve of the consumption of the site may be generated for each of the time intervals in the billing period (similar to the curve of chart 410). Block 610 is similar, but instead produces a probability distribution of mitigation data for the generator and/or peak demand reduction system for the billing period. Thus, a distribution curve of the production of the generator (and/or output of the peak demand reduction system) may be created for each of the time intervals in the billing period, similar to the curve of chart 418. For 15-minute intervals and a 30-day billing period (e.g., the month of April), 2880 demand distribution curves and 2880 production distribution curves would be generated by blocks 608, 610, representing one for each interval in the 30-day period, and each of these distribution curves may include the frequency that various average demand or mitigation values will be produced at the site in those intervals.

With the plurality of distribution curves generated, block 612 may simulate the projected net demand of the site for each time interval in the billing period. The simulation may be a Monte Carlo simulation, as described above, wherein a net demand distribution curve is generated for each time interval. Thus, for example, 2880 net demand distribution curves may be generated by random sampling of the data in the distribution curves of the demand and mitigation data of blocks 608 and 610 using tens of thousands of samples. This net demand distribution curve may be similar to the net demand curves of charts 420, 422, or 424, depending on whether a peak demand reduction system, intermittent generator, or both, are included in the data received in blocks 602 and 604. The expected revenue of that peak demand system/intermittent generator combination may be used to produce a distribution curve of the expected revenue of the overall system in that billing period in block 618. If the expected revenue meets the requirements of the risk tolerance received in block 606, the management system and generator may be recommended to be implemented, accepted, and/or funded.

In some embodiments, however, block 614 may be used to further optimize the peak demand reduction and/or generator system. Block 614 may be performed in conjunction with block 612, wherein the simulation of block 612 may be iteratively performed with a variety of configurations of the peak demand reduction system, generator system, and software controlling the peak demand reduction system. For example, distribution curves for the time intervals of the billing period may be generated using an initial peak demand reduction system having a predetermined initial setpoint and an initial intermittent generator in block 612. The method 600 may include changing one or more of these initial parameters and generating distribution curves for the modified parameters. For example, this may allow the user to determine the effect that various setpoint settings or various battery capacity sizes would have on the net demand distribution curves of the site. Likewise, the user may determine the effect that various changes to the capacity or other characteristics of the intermittent generator would have on the net demand distribution curves.

Under each of these iterated conditions, block 614 may track rates of failure of each configuration. For example, the method 600 may monitor whether the simulated net demand distribution curves encounter failure events such as total depletion of a battery in the peak demand reduction system. The failure rates and frequency information of the net demand distribution curves generated for each iterated system may then be compared in block 616 to determine which peak demand reduction system(s), intermittent generator(s), and setpoint(s) would provide the best service to the fiancier/insurer/purchaser based on the risk tolerance information of block 606. In one example, an optimal system may be identified in block 616 as the system having a price within a range provided by the financier/insurer/purchaser (e.g., in block 606) and providing the lowest peak demand in the net demand distribution curve that would most likely represent a time interval used to generate a peak demand charge.

Once a preferable system is identified in block 616, a distribution curve of expected revenue from the system is generated in block 618. This expected revenue distribution curve for the site may be the product of another Monte Carlo simulation, wherein random data is sampled from the net demand distribution curves of all of the time intervals for that billing period (i.e., the distribution curves generated in block 612). A final, after-generator and after-peak demand reduction system, peak demand charge is calculated for that billing period in connection with each random sampling of the net demand distribution curves, and the final peak demand charges of thousands or more of the simulations are aggregated to form the expected revenue distribution curve for that billing period. By referencing the expected revenue distribution curve of block 618, the user may determine the frequency that the generator and/or peak demand reduction system will provide various revenue amounts in that billing period. Thus, the likelihood of various revenue amounts being generated may be assessed by the financier/insurer/purchaser before purchasing or installing the generator and/or peak demand reduction system with an amount of specificity not previously known in the art.

FIG. 7 extends the method 600 of FIG. 6. The method 700 of FIG. 7 begins by receiving a plurality of expected revenue distribution curves for a plurality of billing periods. Thus, block 702-1 may represent the expected revenue distribution curve of a site for a first billing period (e.g., April), block 702-2 may represent the expected revenue distribution curve of the site for a second billing period (e.g., May), and block 702-n may represent the expected revenue distribution curve of a site for an n-th billing period (e.g., December). All of these expected revenue distribution curves may be randomly sampled in another Monte Carlo simulation in block 704 to obtain long-term (i.e., longer than one billing period) or multi-period projected revenue values in block 706. In an example embodiment, the projected revenue may be a distribution curve of the projected annual revenue of the generator/peak demand reduction system when 12 consecutive billing periods are referenced in blocks 702.

For a given risk profile, the annual revenue of the system may be projected. For example, if the user accepts a 10 percent risk of failure to produce revenue, block 706 may be referenced to determine the amount of revenue that is expected to be produced annually by the system 90 percent of the time. Thus, the operating and purchasing costs of the system may be calculated in light of the projected revenue generated by the system based on the financier's/insurer's/purchaser's risk tolerance. Similarly, if the user accepts a risk of accruing $3,000 in costs, block 706 may be reference to determine the frequency or probability that $3,000 in costs is expected to occur.

These methods 600, 700 may be implemented as steps performed by a processor based on memory storing the steps of the methods 600, 700 as computer executable instructions. Additionally, these methods 600, 700 may be implemented in connection with a non-transitory computer-readable storage medium storing computer executable instructions that, when executed by a processor, cause the processor to perform the steps of the methods 600, 700.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A method of insuring an intermittent generator of a customer at a customer site, the method comprising:
   configuring a computer to monitor a metered load at the site;
   configuring the computer to monitor generation output of the intermittent generator;
   determining a consumption distribution curve of the load using the metered load monitored by the computer;
   determining a production distribution curve of the intermittent generator using generation output monitored by the computer;
   generating a net demand distribution curve using a computer-assisted simulation that accesses the consumption distribution curve and the production distribution curve;
   referencing the net demand distribution curve to determine a risk of the intermittent generator failing to provide a threshold amount of power to the site;
   insuring the customer against the intermittent generator failing to provide the threshold amount of power to the site;
   determining a failure of the intermittent generator to provide the threshold amount of power;
   determining that a peak demand charge will be assessed in response to the failure of the intermittent generator;
   paying at least a portion of the peak demand charge on behalf of the customer.

2. The method of claim 1, further comprising determining a financial value of the risk.

3. The method of claim 2, further comprising assessing an insurance premium to the customer, the insurance premium being dependent upon the financial value of the risk.

4. The method of claim 3, further comprising determining an expected value of the production of the generator by assigning financial value to the production distribution curve, wherein the insurance premium is less than an expected value of the production of the generator.

5. The method of claim 1, wherein the portion of the peak demand charge comprises a portion resulting from the intermittent generator failing to provide the threshold amount of power to the site.

6. A computing device configured for insuring an intermittent generator of a customer at a customer site, the computing device comprising:
   a processor configured to monitor a metered load at the site;
   a processor configured to monitor output of an intermittent generator at the site;
   memory in electronic communication with the processor, wherein the memory stores computer executable instructions that, when executed by the processor, cause the processor to perform the steps of:
   determining a consumption distribution curve using the processor;
   determining a production distribution curve of the intermittent generator using the processor;
   generating a net demand distribution curve using a computer-assisted simulation that accesses the consumption distribution curve and the production distribution curve;
   referencing the net demand distribution curve to determine a risk of the intermittent generator failing to provide a threshold amount of power to the site;

insuring the customer against the intermittent generator failing to provide the threshold amount of power to the site;

determining a failure of the intermittent generator to provide the threshold amount of power;

determining that a peak demand charge will be assessed in response to the failure of the intermittent generator;

paying at least a portion of the peak demand charge on behalf of the customer.

7. The computing device of claim 6, when executed by the processor further causes the processor to perform the steps of determining a financial value of the risk.

8. The computing device of claim 7, when executed by the processor further causes the processor to perform the steps of assessing an insurance premium to the customer, the insurance premium being dependent upon the financial value of the risk.

9. The computing device of claim 8, when executed by the processor further causes the processor to perform the steps of determining an expected value of the production of the generator by assigning financial value to the production distribution curve, wherein the insurance premium is less than an expected value of the production of the generator.

10. The computing device of claim 6, wherein the portion of the peak demand charge comprises a portion resulting from the intermittent generator failing to provide the threshold amount of power to the site.

11. A non-transitory computer-readable storage medium storing computer executable instructions that, when executed by a processor, cause the processor to perform the steps of:

determining a consumption distribution curve using the processor;

determining a production distribution curve of the intermittent generator;

generating a net demand distribution curve using a computer-assisted simulation that accesses the consumption distribution curve and the production distribution curve;

referencing the net demand distribution curve to determine a risk of the intermittent generator failing to provide a threshold amount of power to the site;

insuring the customer against the intermittent generator failing to provide the threshold amount of power to the site;

determining a failure of the intermittent generator to provide the threshold amount of power;

determining that a peak demand charge will be assessed in response to the failure of the intermittent generator;

paying at least a portion of the peak demand charge on behalf of the customer.

12. The non-transitory computer-readable storage medium of claim 11, further comprising determining a financial value of the risk.

13. The non-transitory computer-readable storage medium of claim 12, further comprising assessing an insurance premium to the customer, the insurance premium being dependent upon the financial value of the risk.

14. The non-transitory computer-readable storage medium of claim 13, further comprising determining an expected value of the production of the generator by assigning financial value to the production distribution curve, wherein the insurance premium is less than an expected value of the production of the generator.

15. The non-transitory computer-readable storage medium of claim 11, wherein the portion of the peak demand charge comprises a portion resulting from the intermittent generator failing to provide the threshold amount of power to the site.

* * * * *